United States Patent
Kadonoff et al.

(10) Patent No.: US 12,455,715 B2
(45) Date of Patent: *Oct. 28, 2025

(54) SYSTEM AND METHOD FOR VIRTUAL AND AUGMENTED REALITY EMPLOYING WORKGROUP PODS

(71) Applicant: REPROGRAPHIC PRODUCTS GROUP INC., Arlington, VA (US)

(72) Inventors: Mark Kadonoff, Laurel, MD (US); Thomas Mercer, Laurel, MD (US)

(73) Assignee: REPROGRAPHIC PRODUCTS GROUP INC., Laurel, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 18/388,978

(22) Filed: Nov. 13, 2023

(65) Prior Publication Data

US 2025/0110683 A1    Apr. 3, 2025

Related U.S. Application Data

(63) Continuation of application No. 17/774,597, filed as application No. PCT/US2020/059233 on Nov. 5, 2020, now Pat. No. 11,816,386.

(Continued)

(51) Int. Cl.
*G06F 3/00* (2006.01)
*G06F 3/14* (2006.01)
*H04L 67/131* (2022.01)

(52) U.S. Cl.
CPC .......... *G06F 3/1454* (2013.01); *G06F 3/1446* (2013.01); *H04L 67/131* (2022.05)

(58) Field of Classification Search
CPC .... G06F 3/1423; G06F 3/1431; G06F 3/1446; G06F 3/1454; G09G 2300/026;

(Continued)

(56) References Cited

U.S. PATENT DOCUMENTS

2002/0083137 A1    6/2002  Rogers et al.
2002/0184310 A1   12/2002  Traversat
(Continued)

OTHER PUBLICATIONS

Radkowski et al. "Enhanced natural visual perception for augmented reality-workstations by 1-3 Simulation of perspective." In: Journal of display technology. May 2014 (May 2014) Retrieved on Jan. 3, 2020 (Jan. 3, 2020) from <https://www.osapublishing.org/DirectPDFAccess/C632734E-E92E-426C-99A9CE47703E6AOB_282960/jdt-10-5-333.pdf?da=1 &id=282960&seq=O&mobile=no> entire document.

(Continued)

*Primary Examiner* — Insa Sadio
(74) *Attorney, Agent, or Firm* — Carlos R. Villamar; The Villamar Firm PLLC

(57) ABSTRACT

A virtual and augmented reality system, method and computer program product employing workgroup pods, including work pods configured as three-dimensional closed polygon physical structures having n sides including respective walls having respective computer displays linked to each other via a communications network for enabling augmented and/or virtual reality content to be displayed thereon. Inside wall displays are a private work stage for private augmented and/or virtual reality content, outside wall displays are public private work stage for shared content. One of the work pods is a workgroup pod that receives and merges shared augmented and/or virtual reality content from the other work pods on a private stage thereof, and shares and displays the merged augmented and/or virtual reality content on a public stage thereof.

18 Claims, 30 Drawing Sheets

Related U.S. Application Data

(60) Provisional application No. 62/932,120, filed on Nov. 7, 2019.

(58) Field of Classification Search
CPC ... G09G 2340/0407; G09G 2340/0442; G09G 2340/14; G09G 2354/00; G09G 2370/12; G09G 2370/20; G09G 5/003; G09G 5/14; H04N 21/431; H04L 67/131
See application file for complete search history.

(56) References Cited

U.S. PATENT DOCUMENTS

| | | | |
|---|---|---|---|
| 2010/0218435 A1 | 9/2010 | Reeves | |
| 2011/0244798 A1* | 10/2011 | Daigle | G06Q 30/0226 |
| | | | 455/41.2 |
| 2019/0235821 A1* | 8/2019 | Loffler | G09G 5/003 |

OTHER PUBLICATIONS

Mandiga. "Mixing realities for workplace collaboration." In: Medium. Mar. 27, 2018 1-3 (Mar. 27, 2018) Retrieved on Jan. 3, 2020 (Jan. 3, 2020) from <https://medium.com/flock-chaUmixing-realities-for-workplace-collaboration-d22f4eOf9d2> entire document.
PCT ISR & WO PCT Ser. No. PCTUS2059233, Feb. 5, 2021.

\* cited by examiner

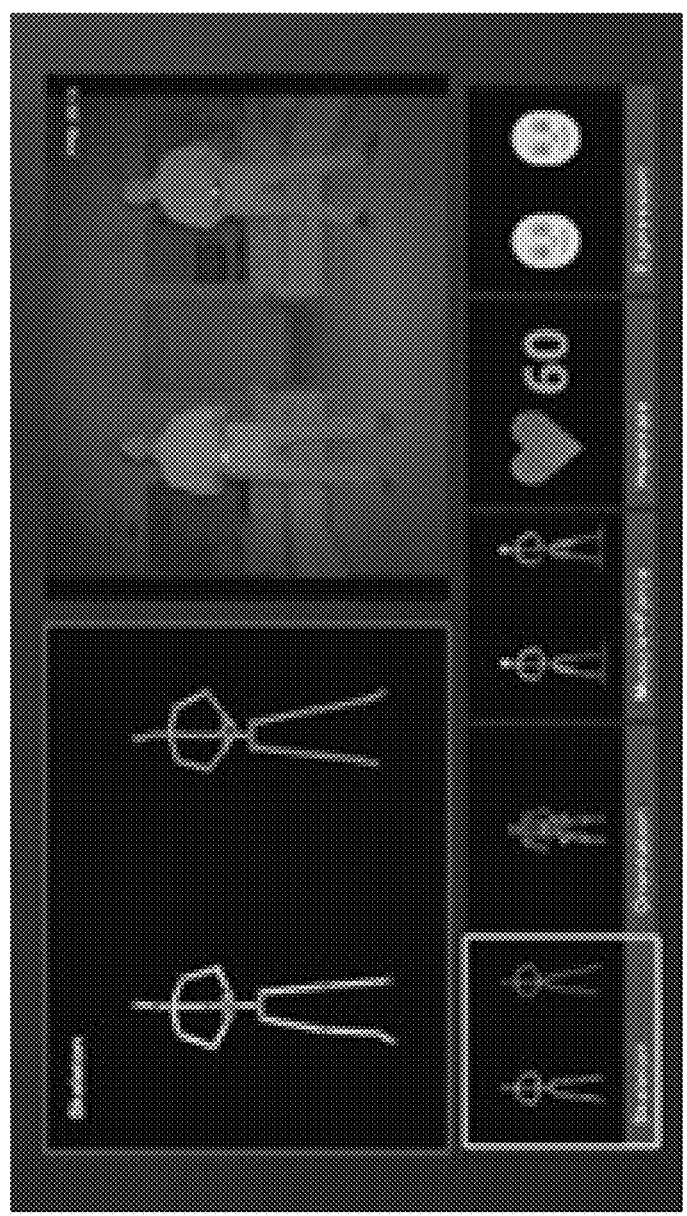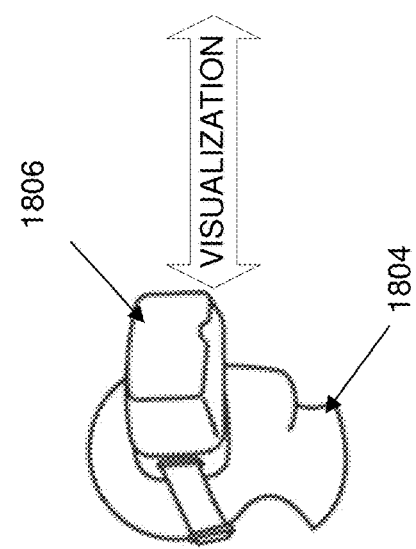
FIG. 18

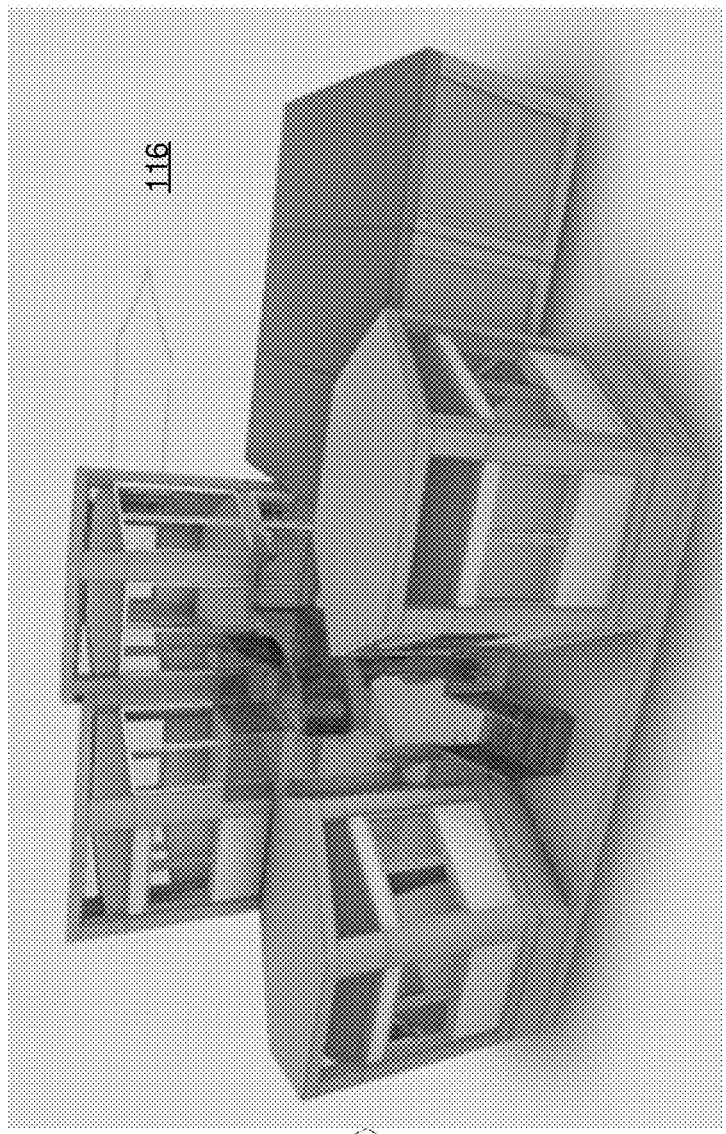
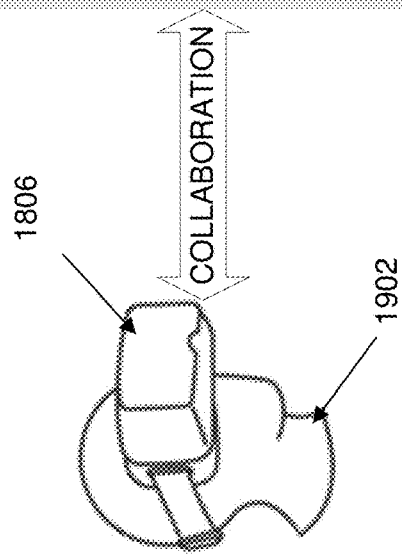
FIG. 19
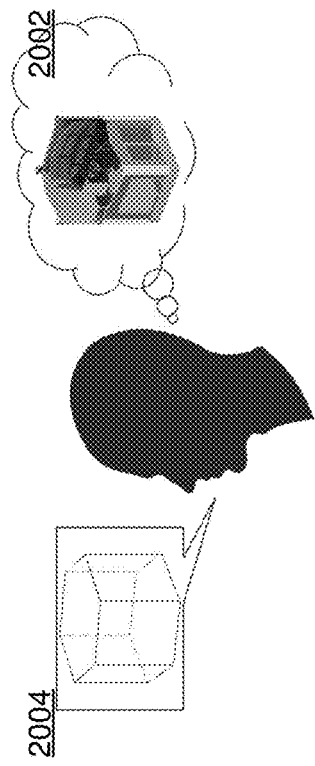
FIG. 20

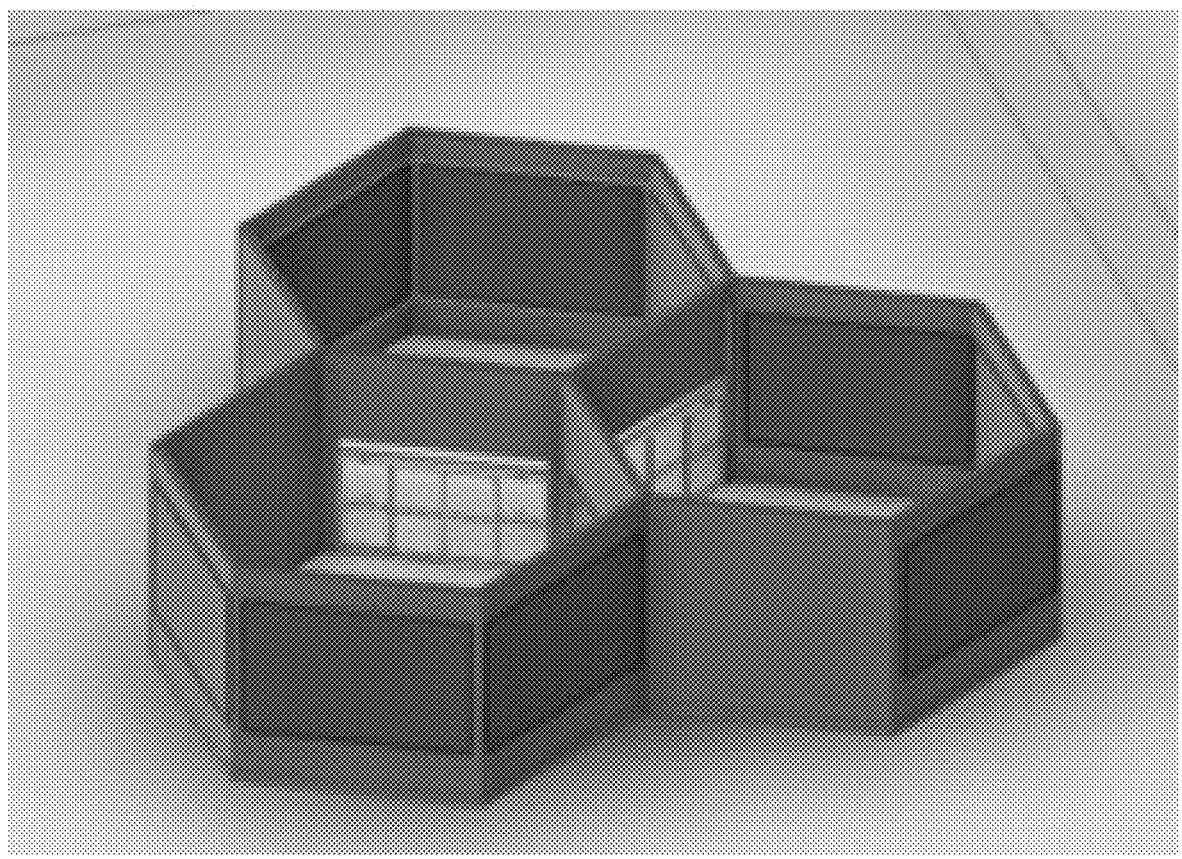
FIG. 47     4700
FIG. 48     4800

SYSTEM AND METHOD FOR VIRTUAL AND AUGMENTED REALITY EMPLOYING WORKGROUP PODS

CROSS REFERENCE TO RELATED APPLICATIONS

The present invention is a continuation of U.S. patent application Ser. No. 17/774,597 of Mark KADONOFF et al., entitled "SYSTEM AND METHOD FOR VIRTUAL AND AUGMENTED REALITY EMPLOYING WORKGROUP PODS," filed on 5 May 2022, now allowed, which claims priority to PCT Patent Application Serial No. PCT/US20/59233 of Mark KADONOFF et al., entitled "SYSTEM AND METHOD FOR VIRTUAL AND AUGMENTED REALITY EMPLOYING WORKGROUP PODS," filed on 5 Nov. 2020, now inactive, which claims priority to U.S. Provisional Patent Application Ser. No. 62/932,120 of Mark KADONOFF et al., entitled "SYSTEM AND METHOD FOR VIRTUAL AND AUGMENTED REALITY EMPLOYING WORKGROUP PODS," filed on 7 Nov. 2019, now inactive, the entire disclosures of all of which are hereby incorporated by reference herein.

BACKGROUND OF THE INVENTION

Field of the Invention

The present invention generally relates to systems and methods for virtual and augmented reality, and more particularly to systems and methods for virtual and augmented reality employing workgroup pods, and the like.

Discussion of the Background

In recent years, virtual and augmented reality systems have been developed. However, such systems typically are lacking in effective incorporation of workgroup pods, in an efficient and cost-effective manner.

SUMMARY OF THE INVENTION

Therefore, there is a need for a method and system that addresses the above and other problems. The above and other problems are addressed by the illustrative embodiments of the present invention, which provide systems and methods for systems and methods for virtual and augmented reality employing workgroup pods, and the like.

A virtual and augmented reality system, method and computer program product employing workgroup pods, including work pods configured as three-dimensional closed polygon physical structures having n sides including respective walls having respective computer displays linked to each other via a communications network for enabling augmented and/or virtual reality content to be displayed thereon. Inside wall displays are a private work stage for private augmented and/or virtual reality content, outside wall displays are public private work stage for shared content. One of the work pods is a workgroup pod that receives and merges shared augmented and/or virtual reality content from the other work pods on a private stage thereof, and shares and displays the merged augmented and/or virtual reality content on a public stage thereof.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 1 is for illustrating a virtual and augmented reality system employing workgroup pods, and the like;

FIGS. 8-23 are used for illustrating components of workgroup pods of the systems and methods of FIGS. 1-7 and their various applications; and FIGS. 24-49 are used for illustrating various configurations of the workgroup pods of the systems and methods of FIGS. 1-23 and further applications thereof.

DETAILED DESCRIPTION OF THE PREFERRED EMBODIMENTS

The present invention includes recognition of the problem that recent virtual and augmented reality systems that have been developed typically are lacking in effective incorporation of workgroup pods in an efficient and cost-effective manner. Accordingly, the present invention provides virtual and augmented reality systems and methods employing workgroup pods, and the like.

Figure 1:
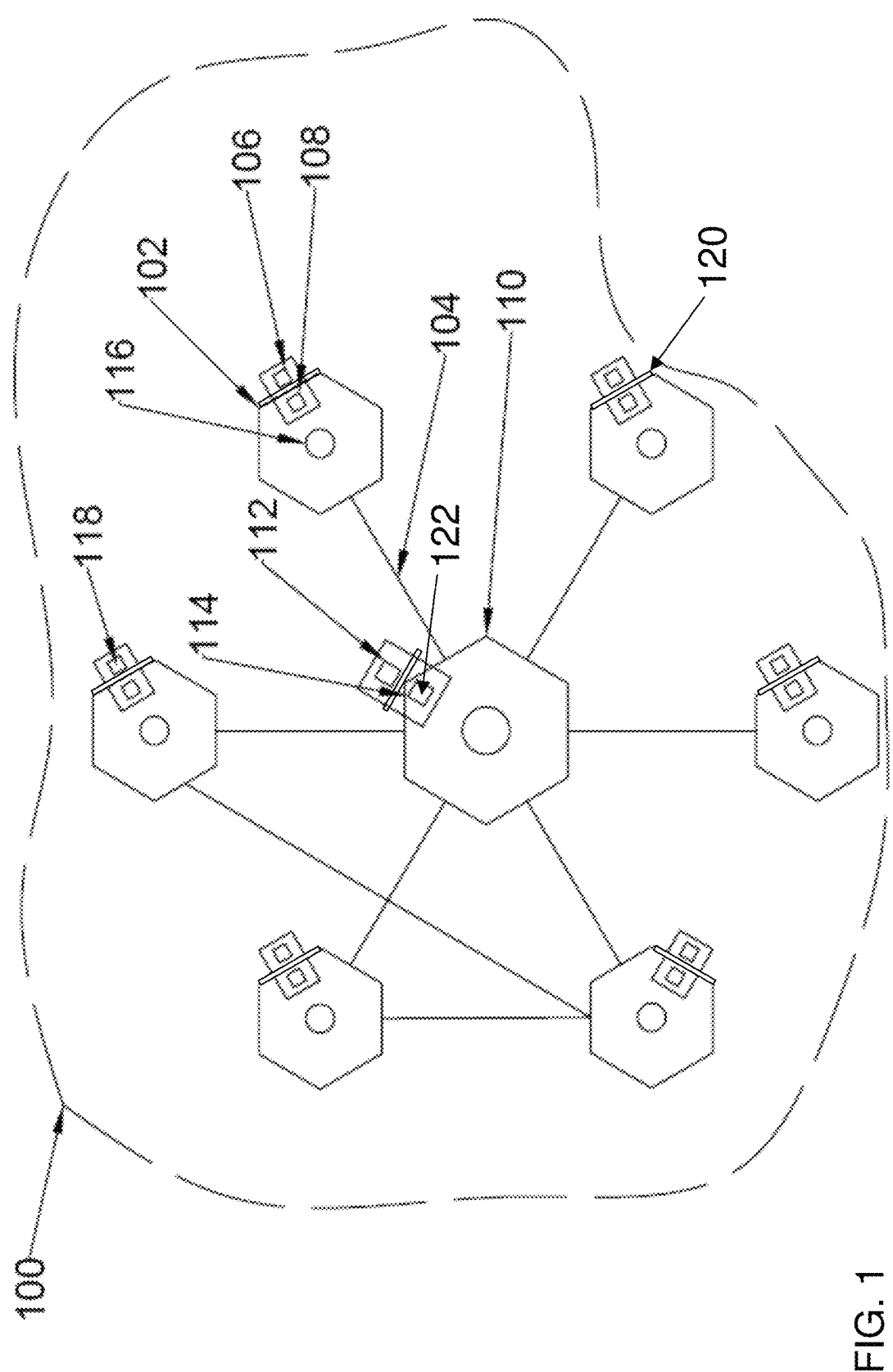

Referring now to the drawings, wherein like reference numerals designate identical or corresponding parts throughout the several views, and more particularly to FIG. 1 thereof, there shown a virtual and augmented reality system employing workgroup pods, and the like. In FIG. 1, the virtual and augmented reality system employing workgroup pods (referred to as "Arpoge HexPod" or "HexPod), for example, can include a workgroup 100, member rooms 102, communications links 104, public member stages 106, private member stages 108, a workgroup room 110, public workgroup stages 112, private workgroup stages 114, members 116, model(s) 118, computer screens 120, merged model 122.

The HexPod is a Computer-Aided Visualization Environment (CAVE) that can be used, for example, for building design and construction, any other suitable CAVE applications, and the like. For example, a CAVE can be used by architects, engineers, contractors, owners, and the like, for communicating and collaborating on a building project, and the like. In the system, a virtual space is like a graph-like structure, wherein the member rooms 102 are nodes, and communication paths are the communications links 104. The member rooms 102 can be configured as three-dimensional closed polygon physical structures, with number of sides n of predetermined length (sn), and height (h), as will be further described. Although, the illustrative configurations are hexagonal polygons, the member rooms 102 can be formed from any suitable closed polygon, as will be appreciated by those of ordinary skill in the relevant art(s). The communications links 104 can be, for example, network connection links with multiple communications channels, and the like. Advantageously, with this architecture, for example, users can create the model(s) 118 for managing building information for design and construction, other suitable applications, and the like.

The basic element for collaboration is the workgroup 100, which can, for example, include the six member rooms 102, and the workgroup room 110, positioned in a hexagonal grid, and the like. The outer rooms are the member rooms 102, and the center room is the workgroup room 110, wherein each of the rooms 102 and 110 can respectively accommodate their member 116, which can be a human or a virtual agent, and the like, performing design and analysis in virtual and/or augmented reality, and the like.

The stages 106, 108, 112 and 114 are virtual platforms within the respective rooms 102 and 110 that are used to design, modify, present, collaborate, and the like, with respect to the model(s) 118. For example, the stages 106, 108, 112 and 114 can employ a computer aided design (CAD) application, a programming interactive development environment (IDE), and the like.

The rooms 102 and 110 have respective public stages 106 and 112, and private stages 108 and 114. The private stages 108 and 114 are rendered and displayed on the screens 120 inside of each of the rooms 106, 108, 112 and 114. The public stages 106 and 112 are rendered and displayed on the screens 112 outside of the rooms 106, 108, 112 and 114. The respective private stages 108 and 114 are where the receptive members 116 can work on their model(s) 118, and the like. For example, when one of the members 116 wishes to share their design with the workgroup 100, they can push their model 118 to their respective public stage 106. Advantageously, the workgroup private stage 114 can automatically merge each member's public stage model 118 to create a workgroup private stage model 122.

Reports can be generated showing results of the merged model 122 and displayed on the outside screens 120, which are on the walls of the workgroup room 110. Advantageously, when the workgroup 100 wishes to share the workgroup private stage model 122 with someone outside of the workgroup 100, they can push the model 122 on the workgroup private stage 114 to the workgroup public stage 112. Advantageously, comments made on the workgroup public stage 112 are captured and available to view by the workgroup 100 on their respective screens 120.

Figure 2:
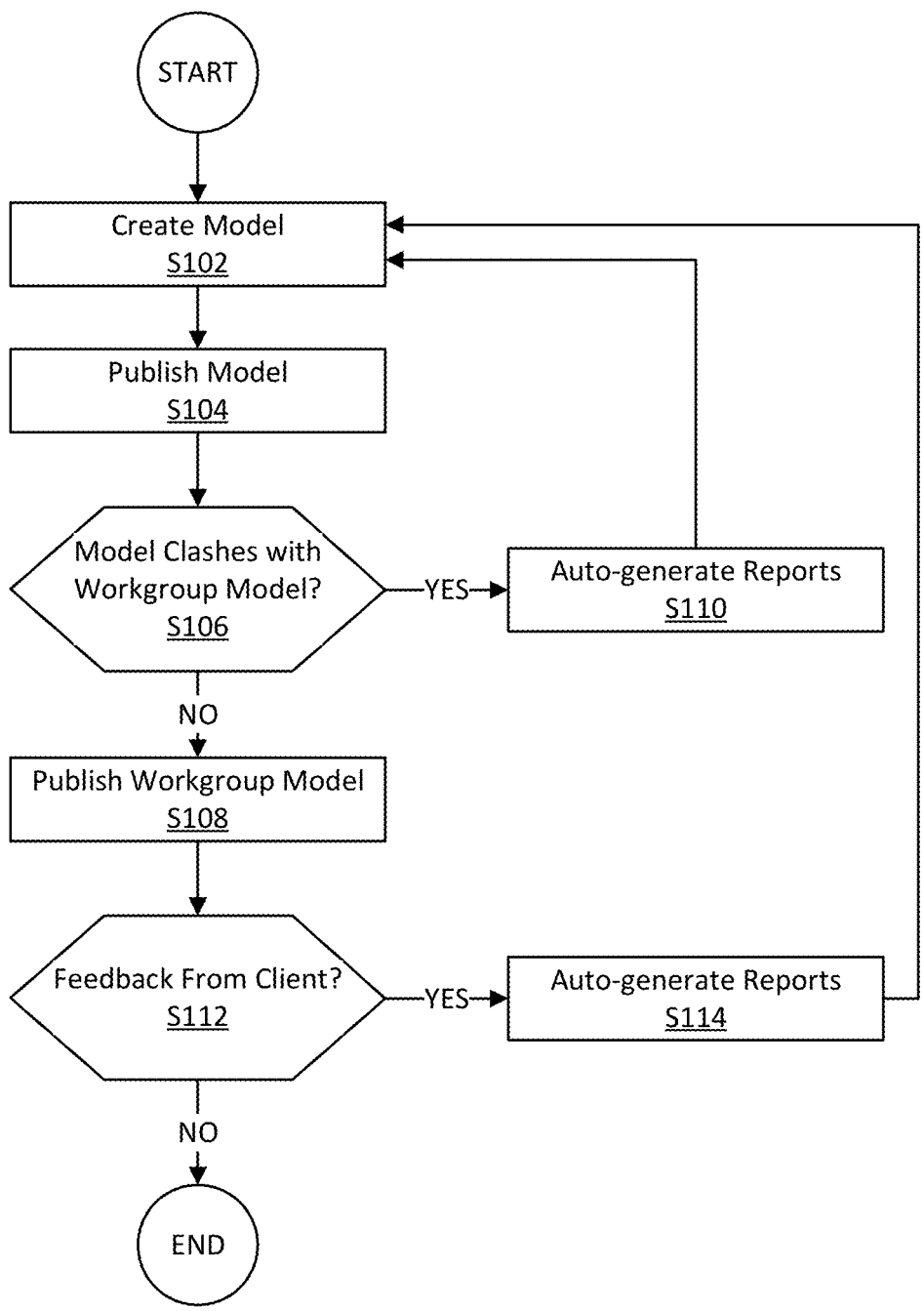
FIG. 2 is a flow chart for illustrating computer implanted processes for the virtual and augmented reality system employing workgroup pods of FIG. 1.

FIG. 2 is a flow chart for illustrating computer implanted processes for the virtual and augmented reality system employing workgroup pods of FIG. 1. In FIG. 2, a member creates a model on their private stage at step S102. The created model is then published to their public stage at step S104.

At step S106, it is determined at the private workgroup stage, if the published model clashes, is incompatible with, and the like, with a corresponding workgroup model, and if so, suitable reports are generated and transmitted at step S110, and processing returns to step S102. If, however, it is determined at step S106 that the published model does not clash, is not incompatible with, etc., with the corresponding workgroup model, processing continues to step S108. At step S108, the model is published on the public workgroup stage, and processing continues to step S112.

At step S112, it is determined if the published model has received feedback from a client, another member, etc., and if so, suitable reports are generated and transmitted at step S114, and processing returns to step S102. If, however, it is determined at step S112 that the published model has not received feedback from a client, another member, etc., and the processing ends.

Figure 3:
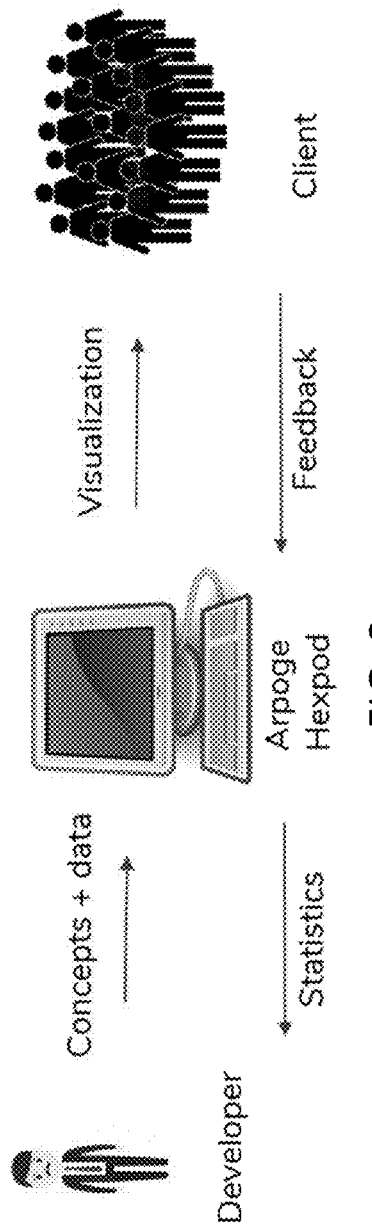
FIGS. 3-7 are used for illustrating how the systems and methods of FIGS. 1-2 can be used to enhance understanding by turning data into signage using public and private stages.

Advantageously, as shown in FIG. 3, the described systems and methods can be used to enhance understanding by turning data into signage. Developers can guide the client's experience. Compatible relationship between humans and machines be formed in a cost-effective and time-efficient manner, while providing a powerful teaching tool and in an eye-catching and engaging manner. Collaboration can be enhanced by converging interpersonal and technological relationships, by providing transfer of ideas and receiving of feedback, by utilizing physical and virtual tools, by allowing clients to be active in product development.

Figure 4:
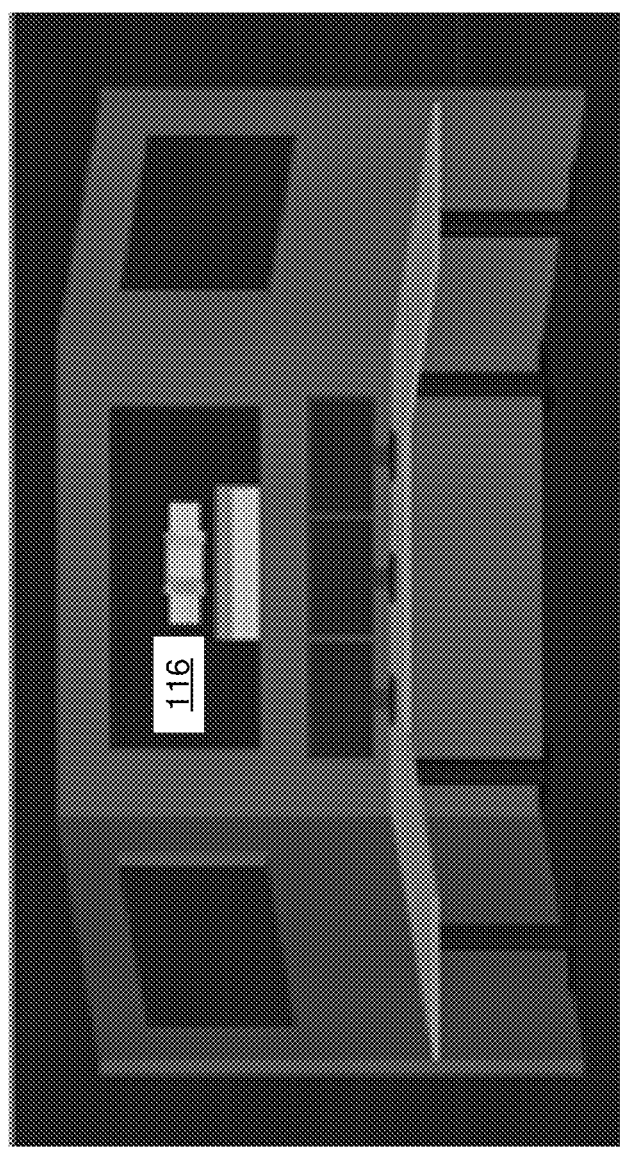
Figure 5:
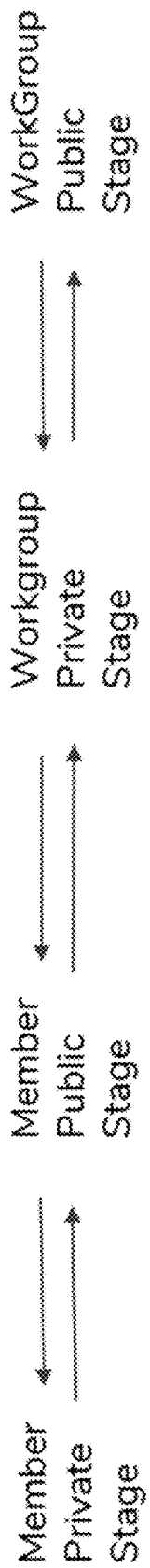
Figure 7:
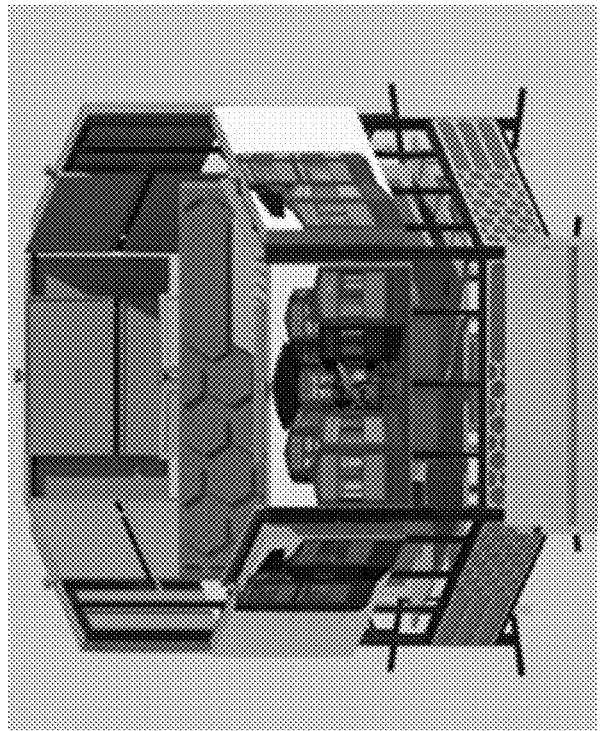
Figure 6:
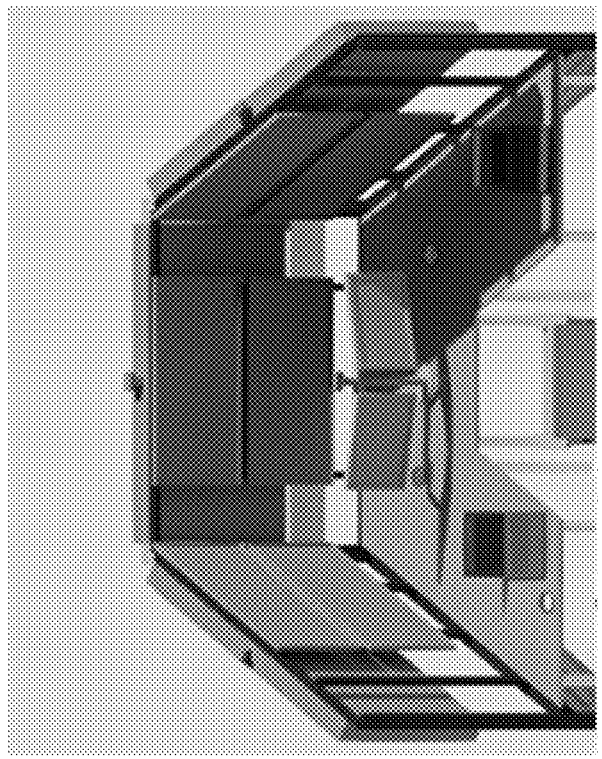

As described above, a stage is where a model sits, the "window" (e.g., via a display device, etc.) provides a view to the stage. The four stages include the workgroup private stage 114, the workgroup public stage 112, The member private stages 108, and the member public stages 106. The systems and methods, advantageously, facilitate the flow of information and collaboration on the model 116, as shown in FIG. 4, within various described roles of each stage, as shown in FIG. 5. The stages can be physical and/or virtual. The workgroup pods can have various configurations, as shown in FIGS. 6-7.

Figure 9:
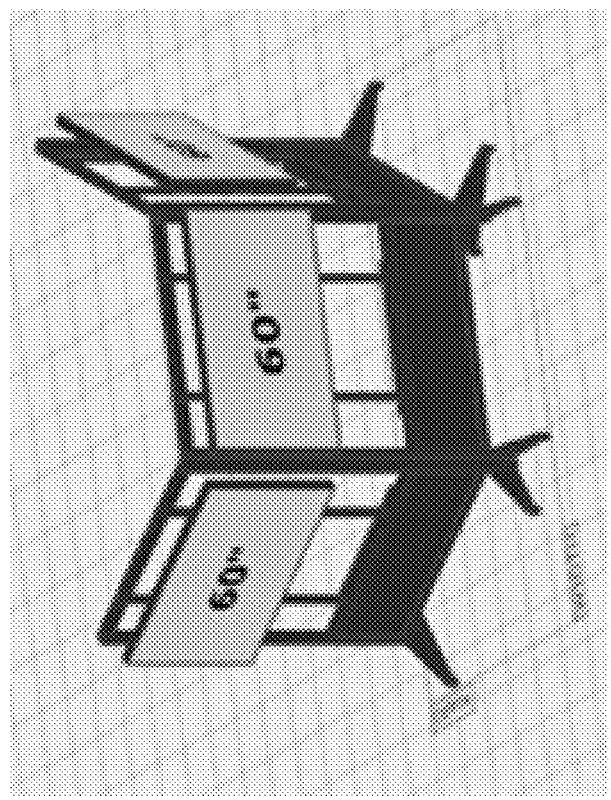
Figure 8:
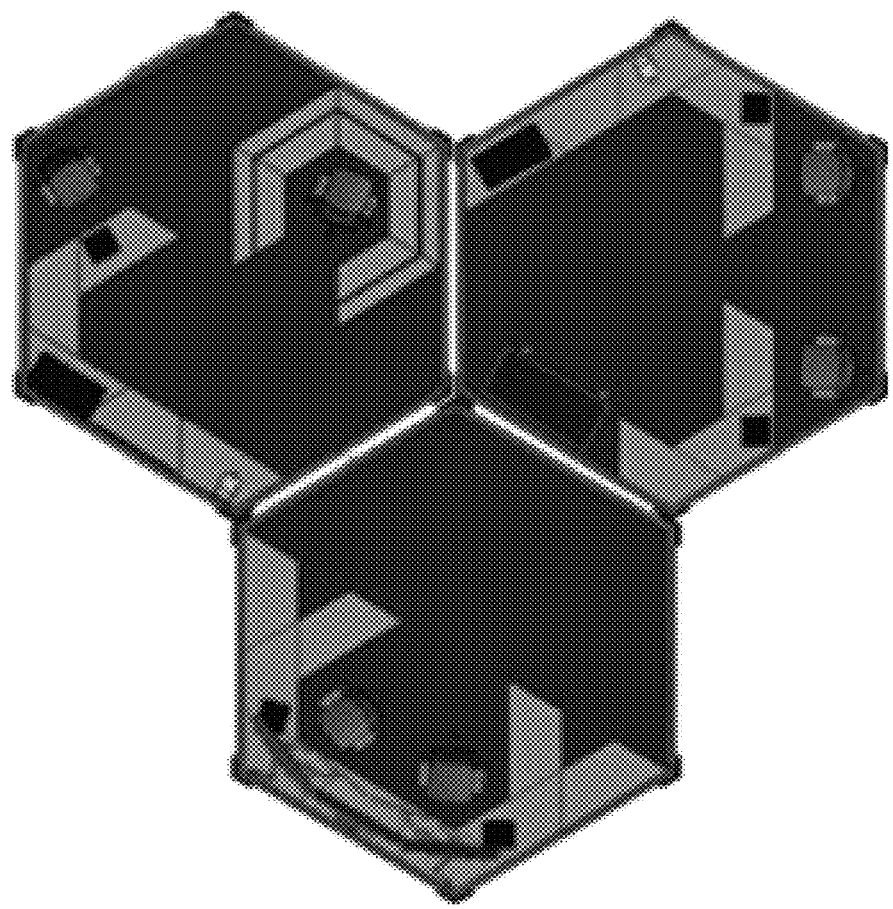
Figure 10:
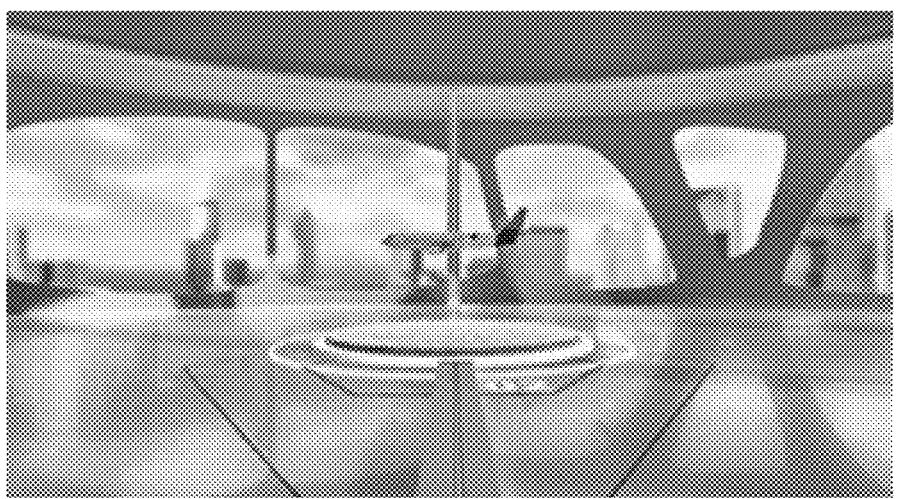
Figure 11:
Figure 12:

The components of the workgroup pods can include inside and outside kiosks to display the virtual workplace with input using computers, and made for individual or group work, with changes made in real time, and with different configurations available, for example, as shown in FIG. 8. The outside kiosks can include displays to be used for virtual tours of showrooms, as a presentation tool for large groups, and so that clients can view the model and interact with it as well, as shown in FIG. 9. The kiosks can be used to generate virtual showrooms, as shown in FIGS. 10-12, used to show the model 116 to clients, and so that developers can generate guided walkthroughs of the showroom. The virtual showrooms can be used for displaying various products of a company, and the like, and can include a large room that clients could walkthrough virtually, with displays of models of products, videos, and documents describing the products, and the like.

Figure 13:
Figure 14:
Figure 15:
Figure 16:
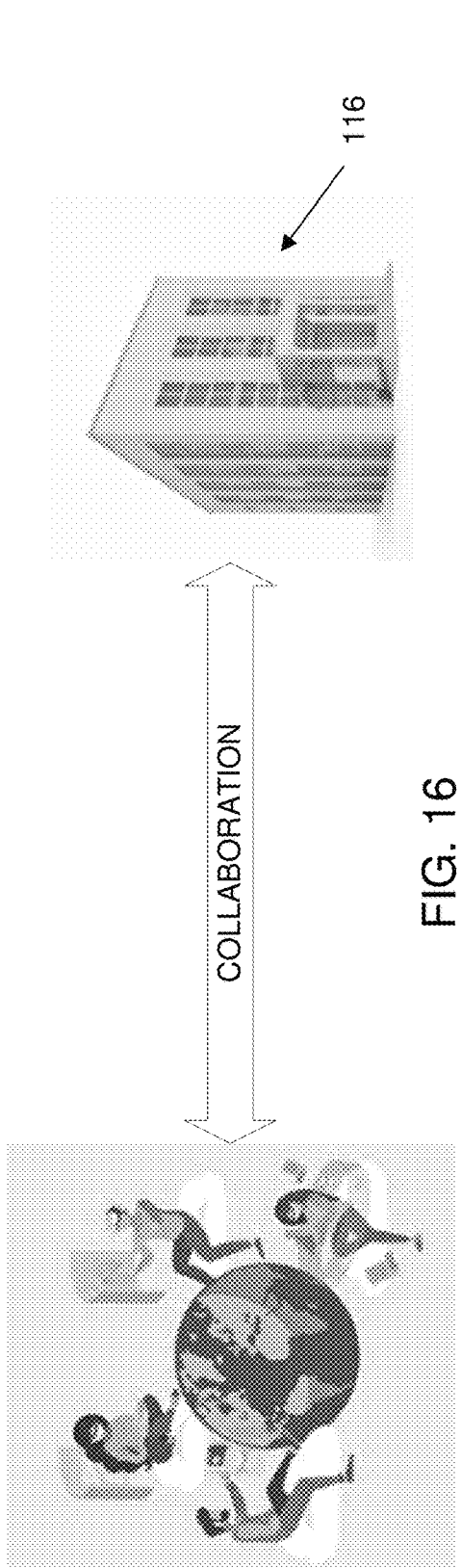
Figure 17:
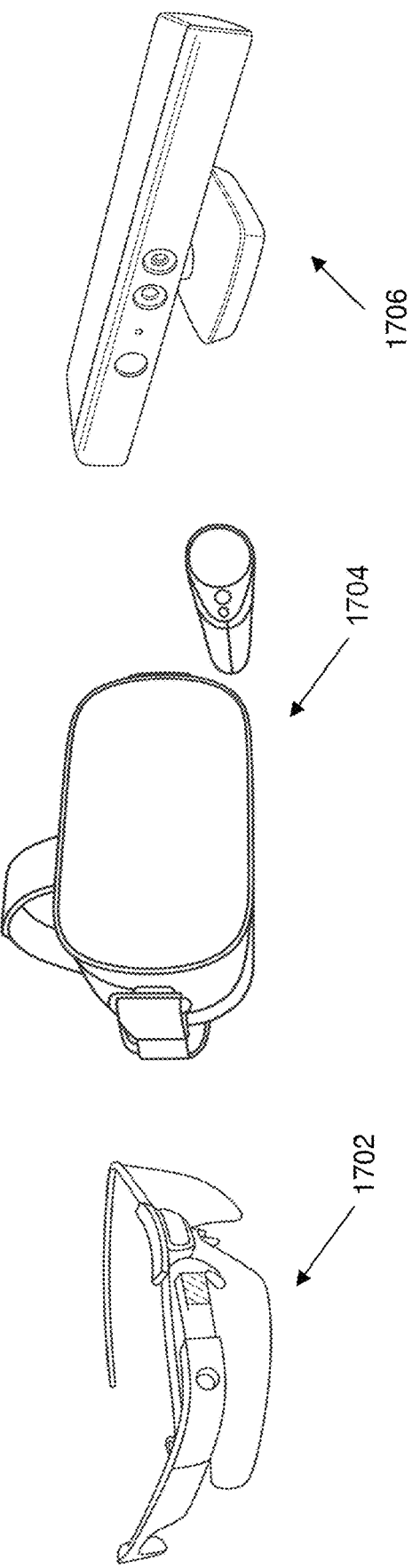

The kiosks also can be used to generate virtual collaboration spaces, as shown in FIGS. 13-15. The kiosks also can be used to create a virtual workspace to allow individual developers around the world to work on their models 116, which then change in real time in the virtual workspace, as shown in FIG. 16. The devices employed can include virtual and augmented reality components to enhance the visualization aspects, to facilitate communication of developers around the world, and including Google Glass 1702, Oculus Rift 1704, and Kinect 1706 devices, and the like, for total immersion into virtual and/or augmented environments, as shown in FIG. 17.

Advantageously, the workgroup pods can be used as visualization aides to enhance understanding by turning data into signage, for displaying the data in an engaging way, for providing statistics, measurements, feedback, etc., for providing models showing light distribution, employee happiness, and distraction models in real time, and so that important aspects of the model are easily viewed. Compatible relationships between humans and machines can be formed, putting computers and people in harmony, and using gestures for easier interaction and control. Developers can influence the client's experience, for example, by providing guided visual tours, and to allow clients stay up to date with changes on the model.

As previously described, and as shown in FIG. 18, the visualization aides can employ CAVE, as a powerful solution for visualization barriers in the modern professional workplace. CAVE is a 3D immersive virtual environment 1802 generated for a user 1804, and that is generated using screens, virtual reality (VR) headsets, projection, motion detection, and/or glasses 1806. This allows for better visualization than a worksheet or model, better human interaction and collaboration, and allows people from all over the world to come together as a community and collaborate.

Figure 21:
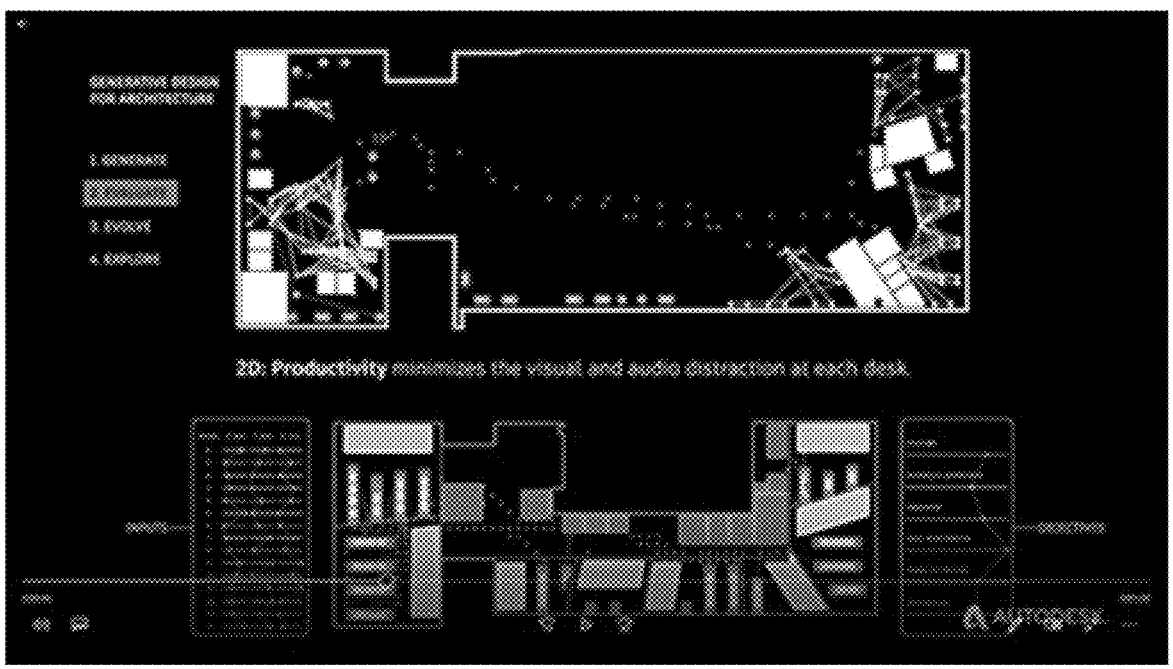
Figure 22:
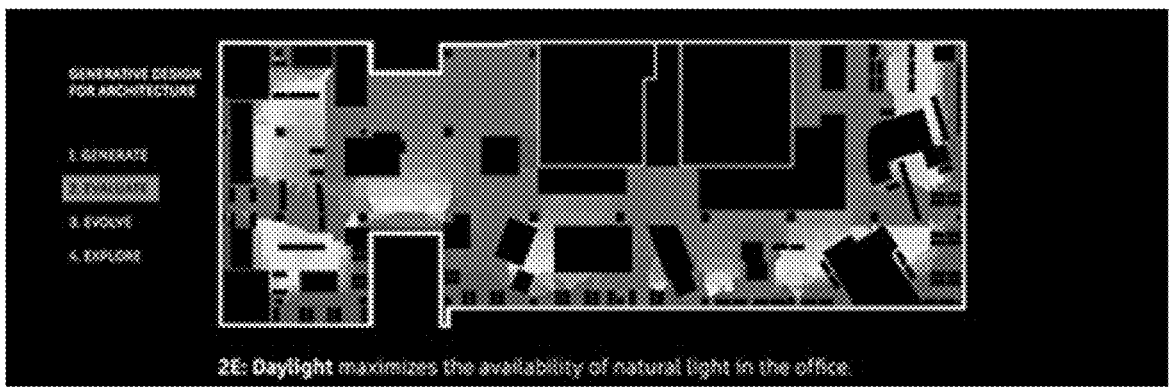
Figure 23:
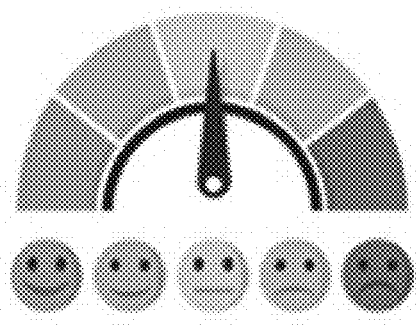

The visualization aides can be used for client and development communication by facilitating feedback and visualization, so that every person that is part of the project will stay on the same page. For example, as shown in FIG. 19, a client 1902 can view the work being performed every step of the way in real time, reducing potential confusion about the product being delivered. The client 1902 can walk through the model 116 and make suggestions. The visualization aides can be used for the transmission of feedback from clients 1902 to developers, including directly commenting on model using a keypad or smart phone. The client's 1902 comments pop up as a user moves through the model 116, to see directly where problems arise, and to reduce miscommunication. Visualization is a key to good design, allows users to communicate abstract and concrete ideas, provides for total visualization using a virtual environment, and fills in the blank between thoughts 2002 and what is said 2004, as illustrated in FIG. 20. Visualization also can be used to convey various concepts and data, as illustrated in FIGS. 21-23.

Figure 24:
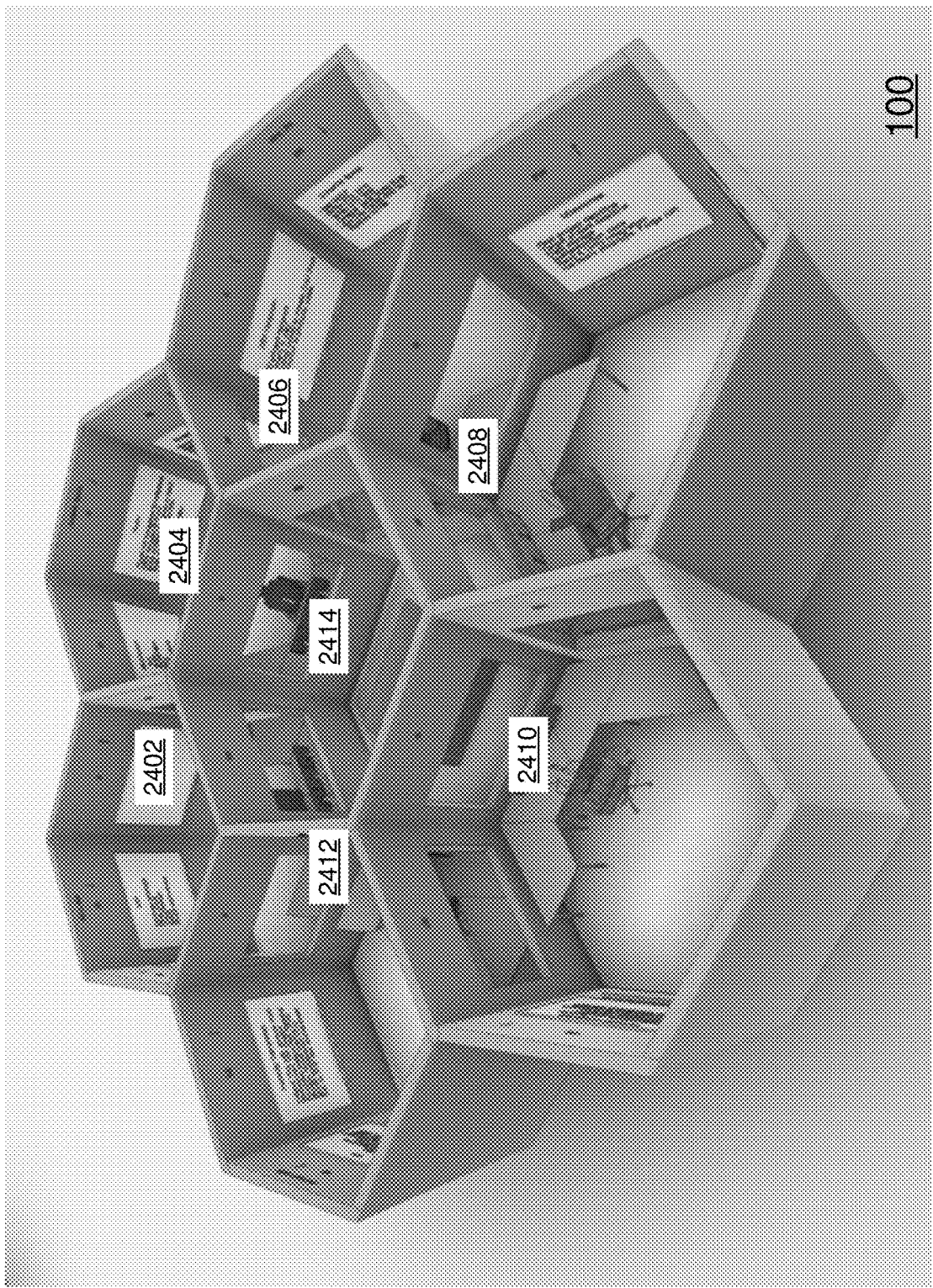
Figure 25:
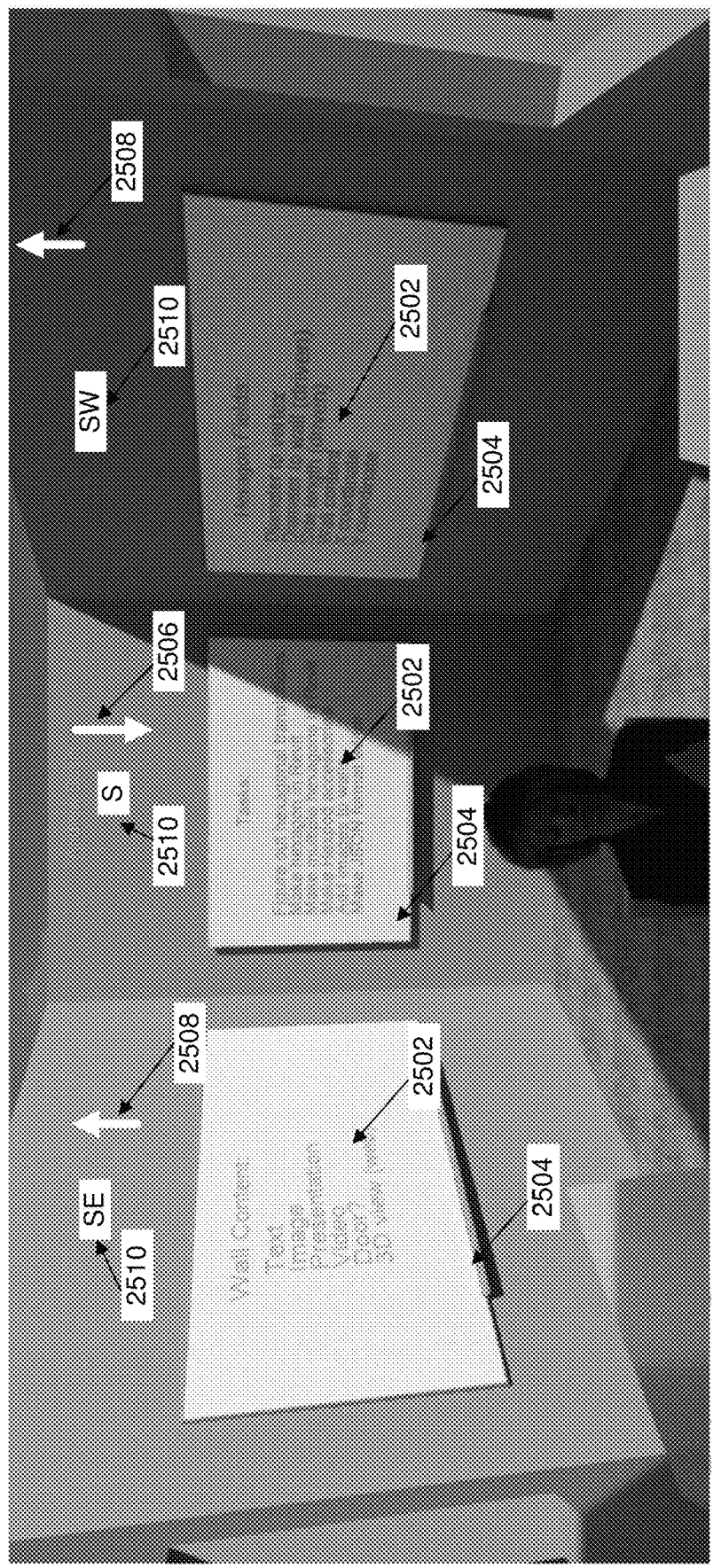

The workgroup pods can take on various configurations. For example, as described with respect to FIG. 1, FIG. 24 shows a HexPod with six work rooms 2402-2412, and a central workgroup room 2414. FIG. 25 show the virtual office pod of one of the six connected users of FIG. 24, including notes 2502 on their respective virtual whiteboards 2504. Each user populates their respective whiteboards 2504 with their own notes and tasks, etc., as one could do in a physical office space. The arrows 2506 and 2508 above each wall are a way of representing whether a particular wall is public or private, for example, wherein a downward arrow 2506 indicates a private wall, and an upward arrow 2508 indicates a public wall. Advantageously, the walls are also labeled with compass directions 2510 to help with understanding orientation when viewing photos, models 116, and the like.

Figure 26:
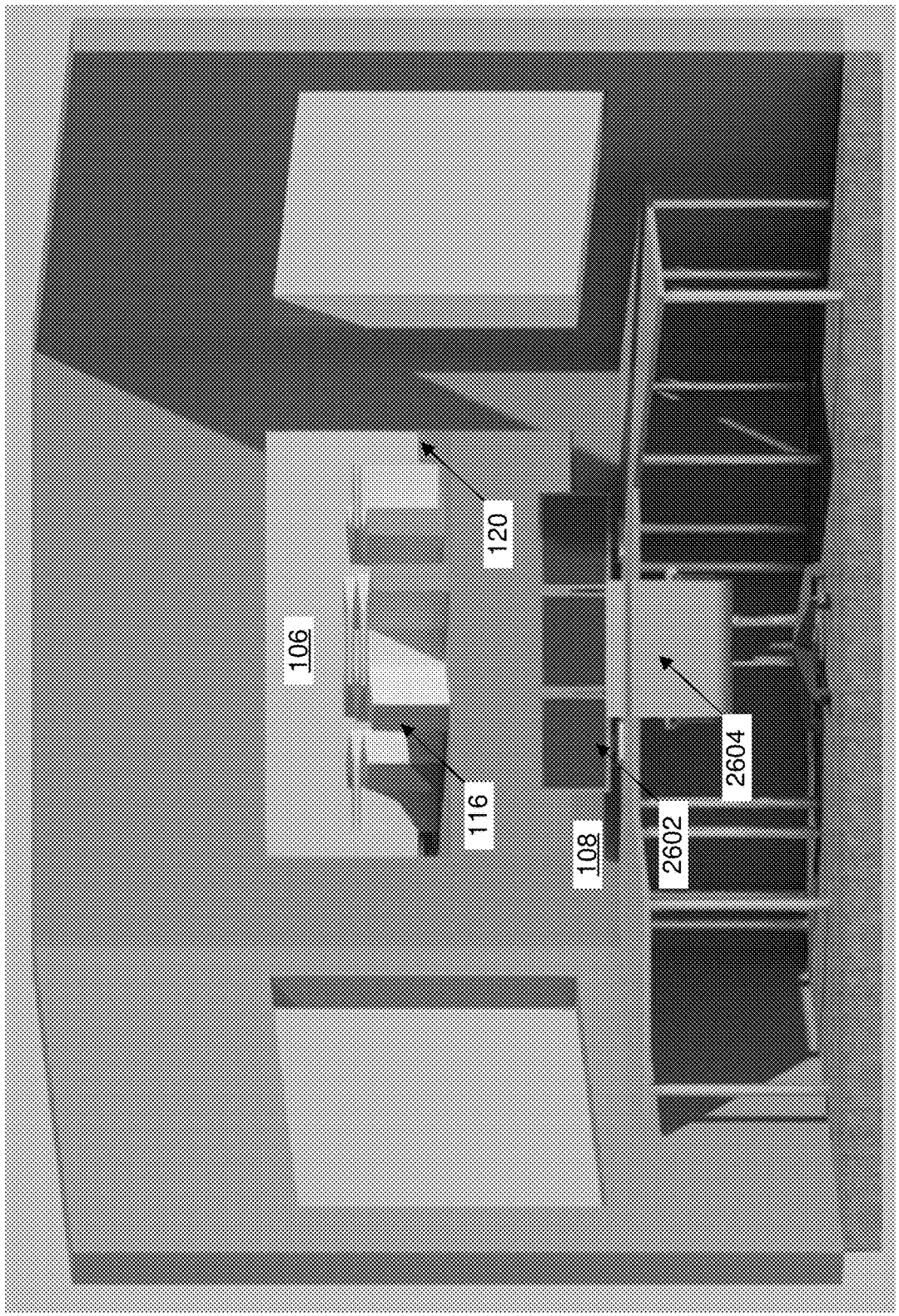
Figure 27:
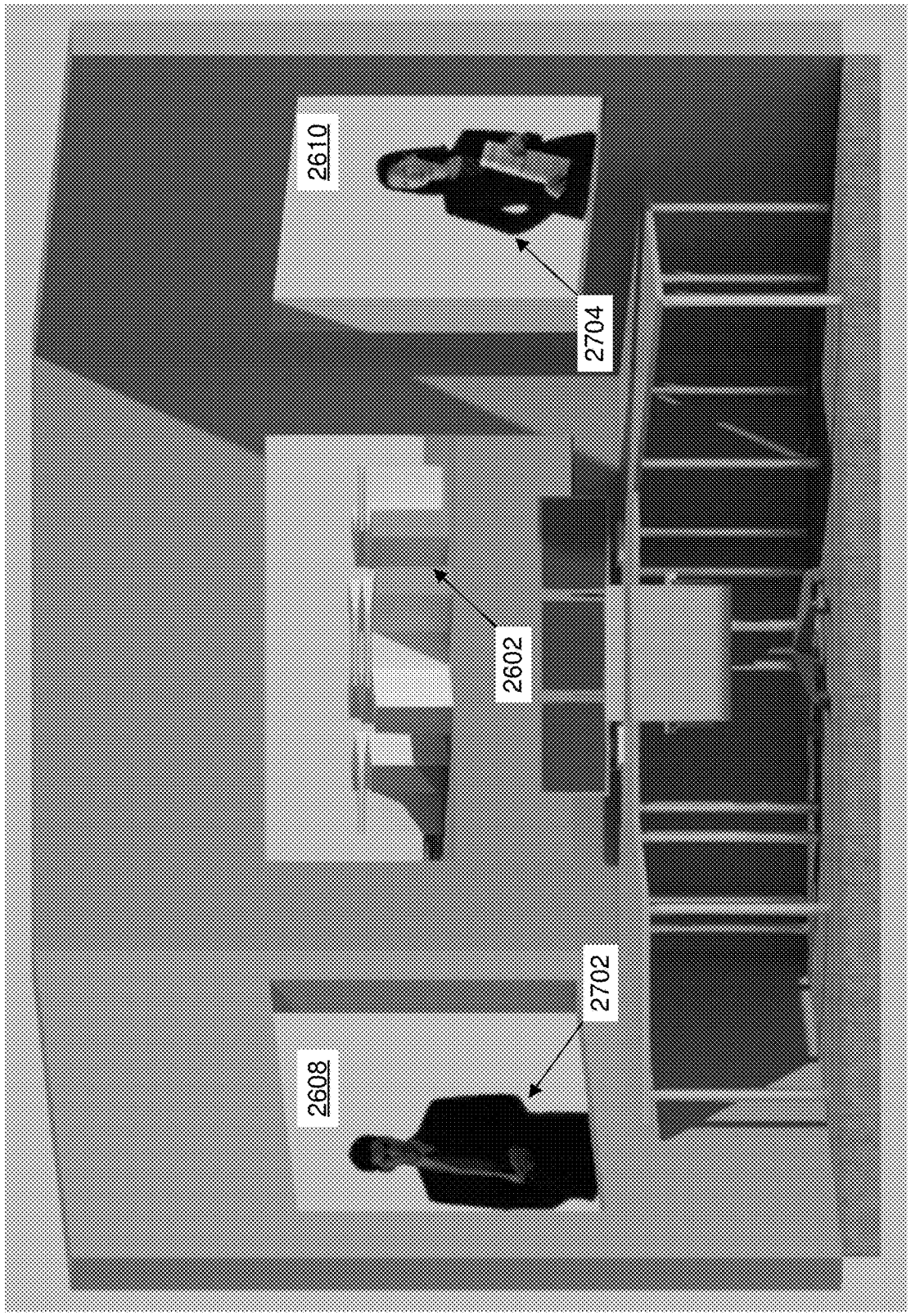
Figure 28:
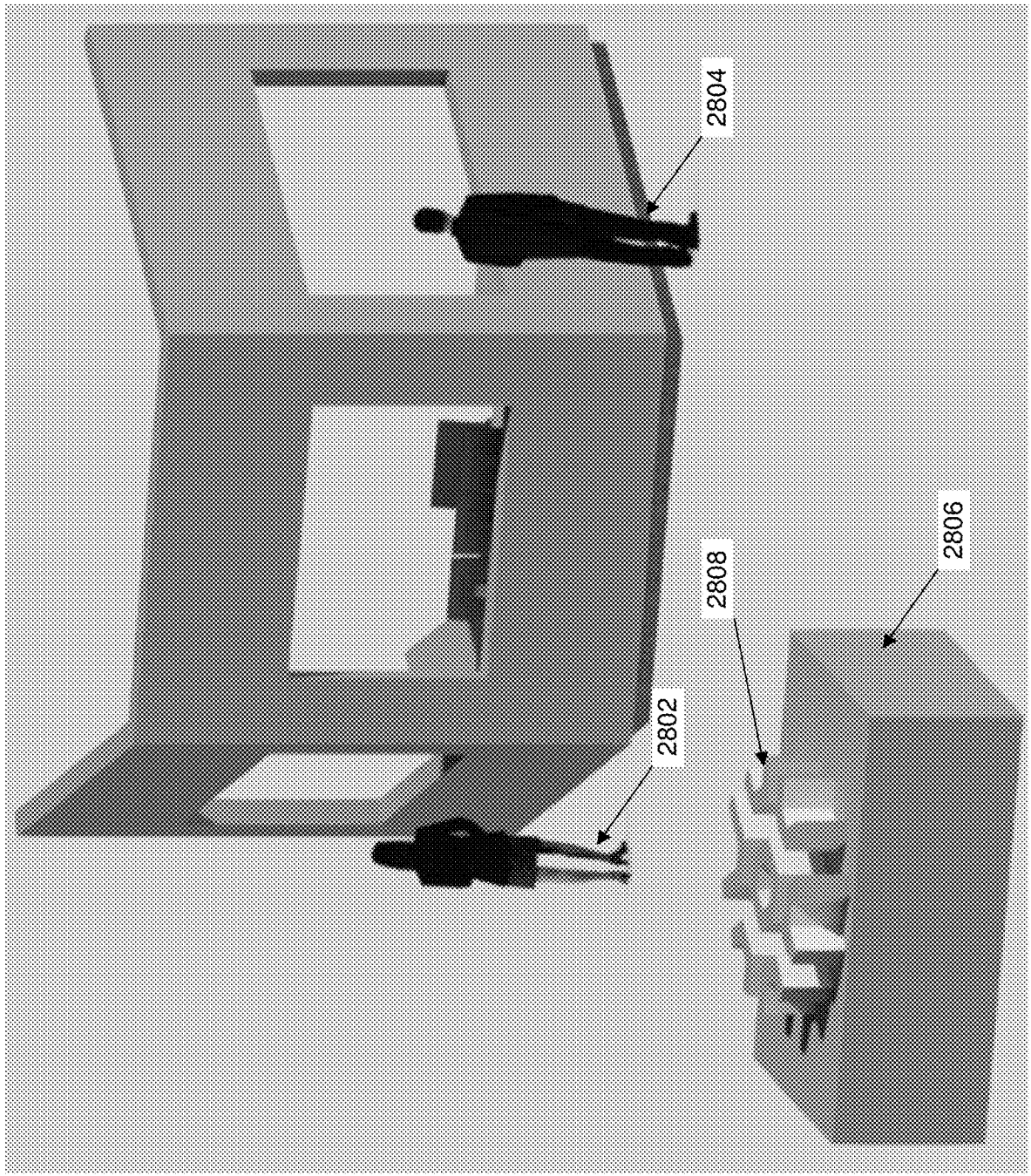

FIG. 26 is showing a view of the private 108 and public 106 stages, with the model 116 displayed on the public stage 106. The public stage 106 is represented on the overhead display 120, and the private stage 108 are the smaller monitors 2602 in front of the chair 2604. The rear walls of this virtual space are not shown, to view the space easier. On the center public stage 106 there is the model 116 of a HexPod workgroup model being displayed. FIG. 27 illustrates avatars 2702 and 2704 shown in two of the linked displays 2608 and 2610. The left 2608 and right 2610 displays are public stages of other users, and that are used to generate virtual rooms, including the avatars 2702 and 2704 of the co-workers, other information, and the like. FIG. 28 is used to illustrate that the system can generate virtual avatars 2802, but can also include humans 2804, as well as real 2806 and virtual objects 2808.

Figure 29:
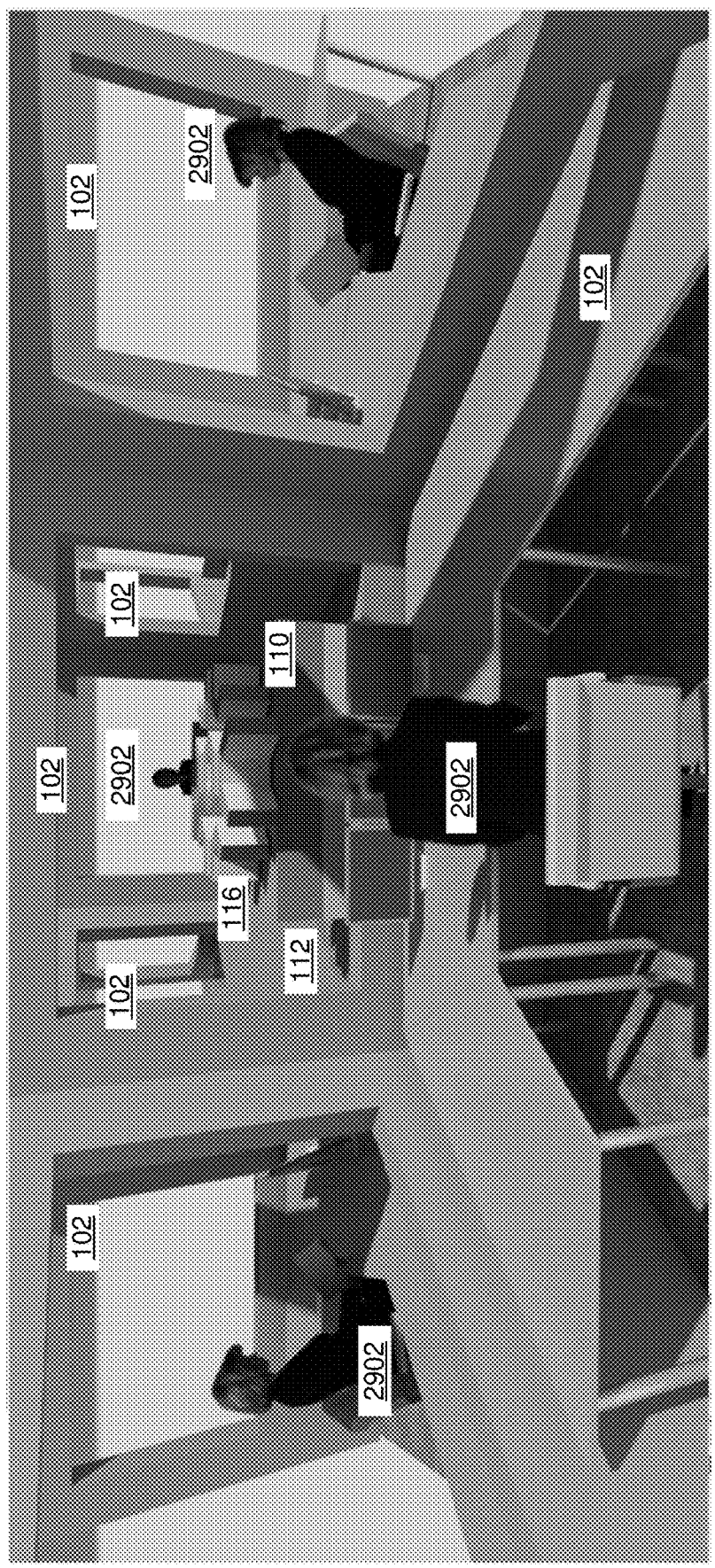
Figure 30:
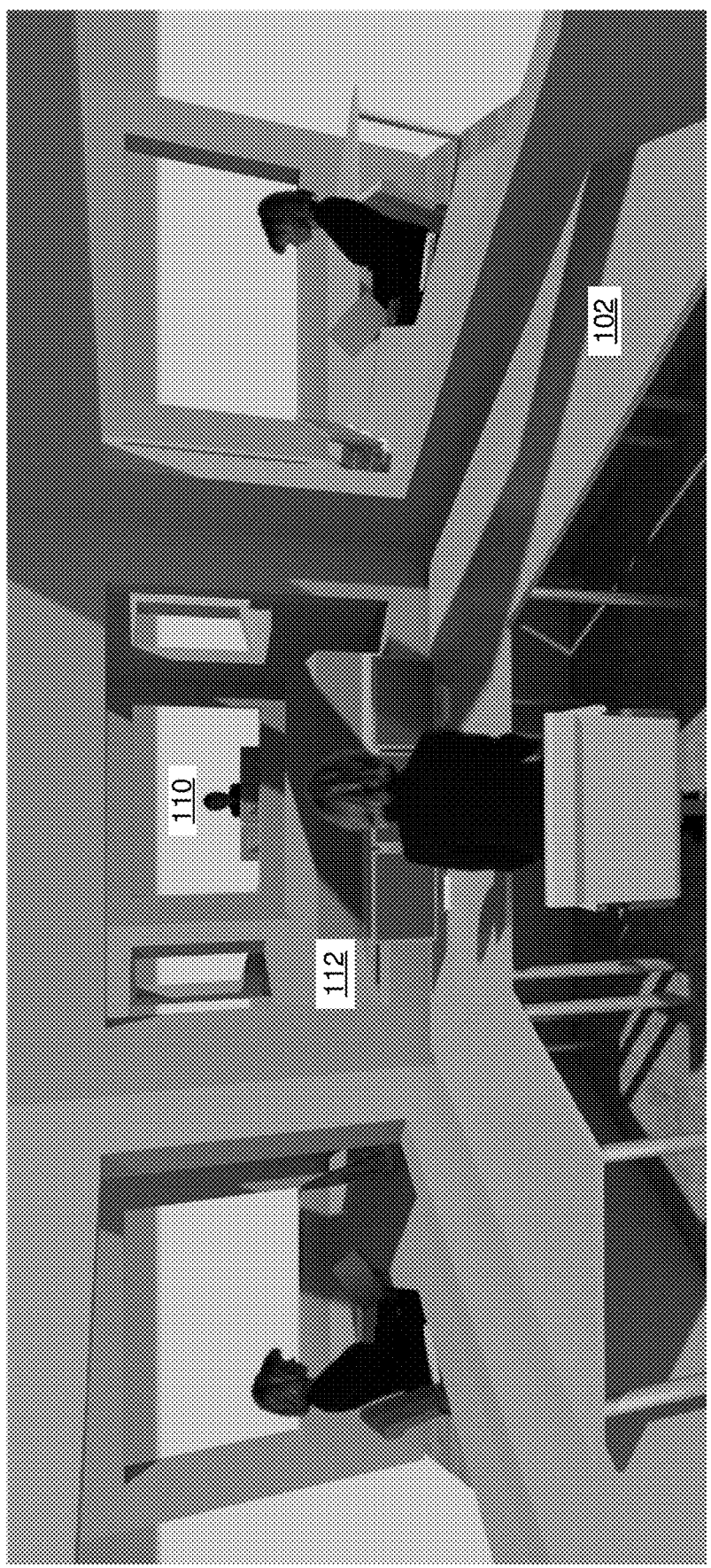

FIG. 29 is used to illustrate an array of HexPods forming the workgroup 100 with members 2902 in the exterior pods 102, and the public workgroup stage 112 in the center pod 110 virtualizing the model 116. The center HexPod, the workgroup room 110, and the six outer HexPods, the member rooms 102, makeup the virtual office environment 100. The windows (e.g., configured as displays) between rooms represent links between public stages, and the computer monitors represent private stages, as previously described. The model 116 of the workgroup 100 on the public workgroup stage 112 is rendered in the center room 110 for collaboration, visualization, and the like. FIG. 30 is the same as FIG. 29, but without the model 116 rendered on the public workgroup stage 112.

Figure 32:
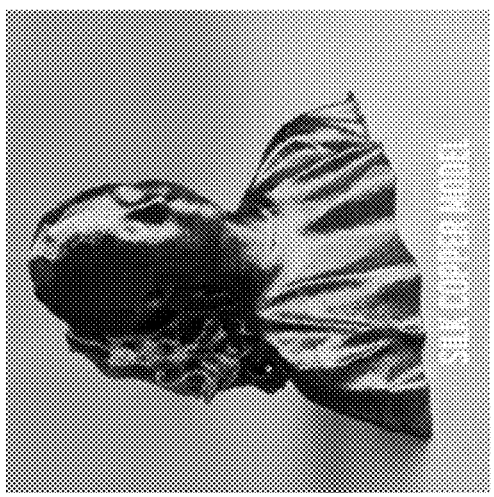
Figure 33:
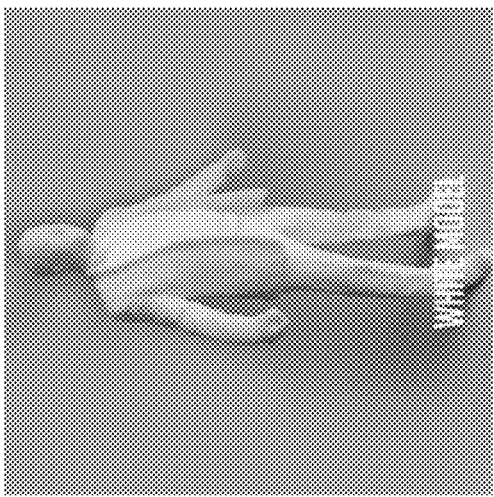
Figure 31:

FIGS. 31-33 are used to illustrate 3D avatar modeling applications, wherein 3D scanners 3102 generate 3D models 3104 or avatars 3106 of people and/or objects. The 3D models 3104 can be used as teaching tools for kids. A kiosk 3100 can scan a user on platform 3106, allow the user to edit the model, such as adding costumes, accessories, and the like 3108, and save the model 3104. The virtual model 3104 can be sent to the user for 3D printing or virtual use, a 3D printed version, as shown in FIGS. 32-33 also can be mailed to the user, and the like. The kiosk can be taken to classrooms and used for free or can be in a mall for commercial use, and the like. Applications of 3D models used with 3D printing technologies, provides a powerful teaching and collaboration tool to introduce young children to 3D printing technology and for collaboration of models.

Figure 34:
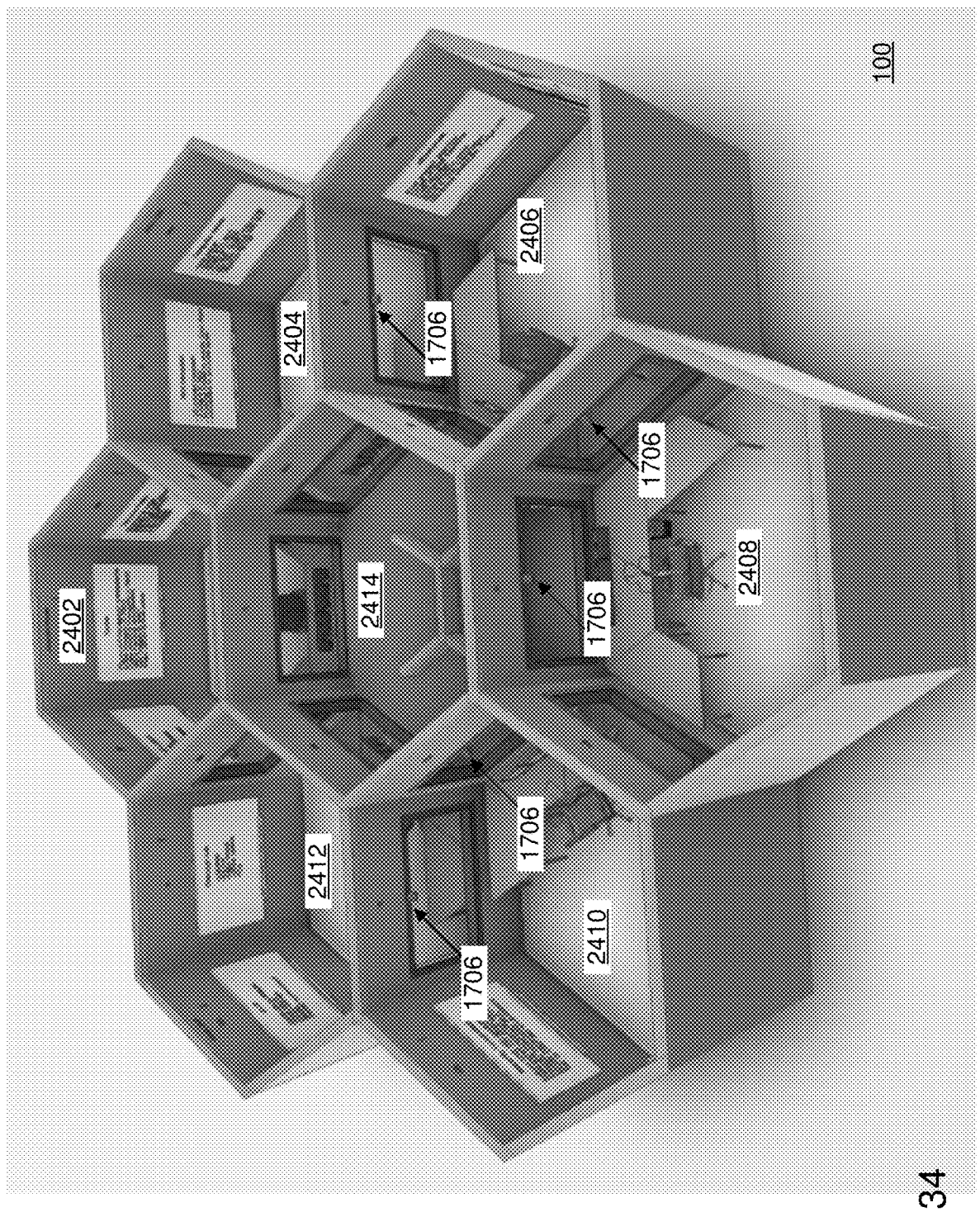
Figure 35:
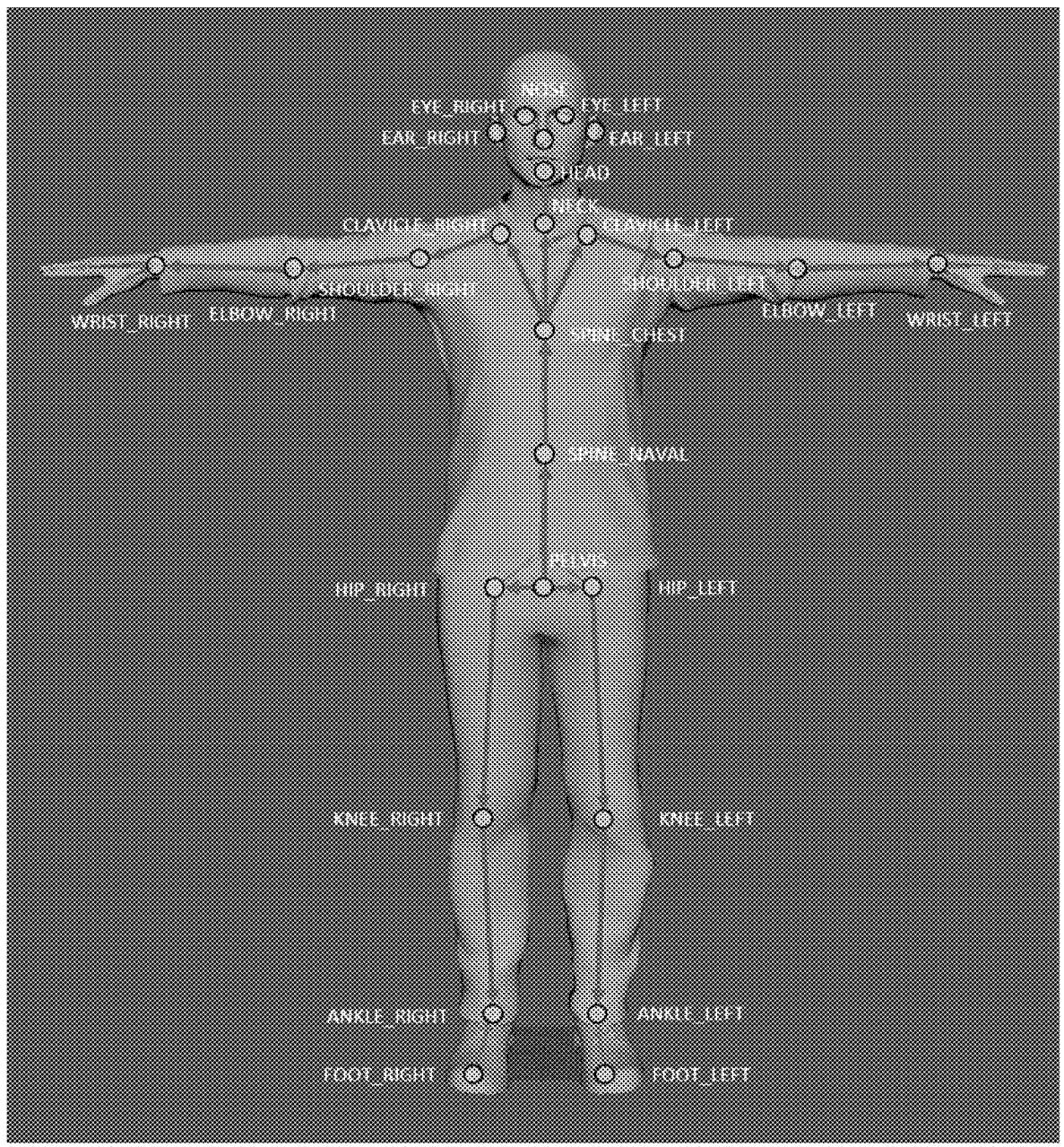

FIG. 34 shows the hexapod workgroup 100 including Kinect or similar devices 1706. As previously described, the HexPod workgroup 100 can include six pods 2402-2412 with one public stage pod 2414 in the middle. Each office of pods 2402-2412 can hold desks, monitors, whiteboards, and the like. The avatars are displayed and can move according to information from suitable tracking devices, such as the Kinect tracking devices 1706, and the like. The six windows (e.g., display screens etc.) can provided on both sides of every wall, and can be used as windows to other offices, displays for models, or to display other information, can have customizable sharing, so users can choose who to share their displays with, and with commenting and voice chat available for communication, as previously described. FIG. 35 shows an image of all the joints that the Kinect device can keep track of for various applications, as previously described.

Figure 36:
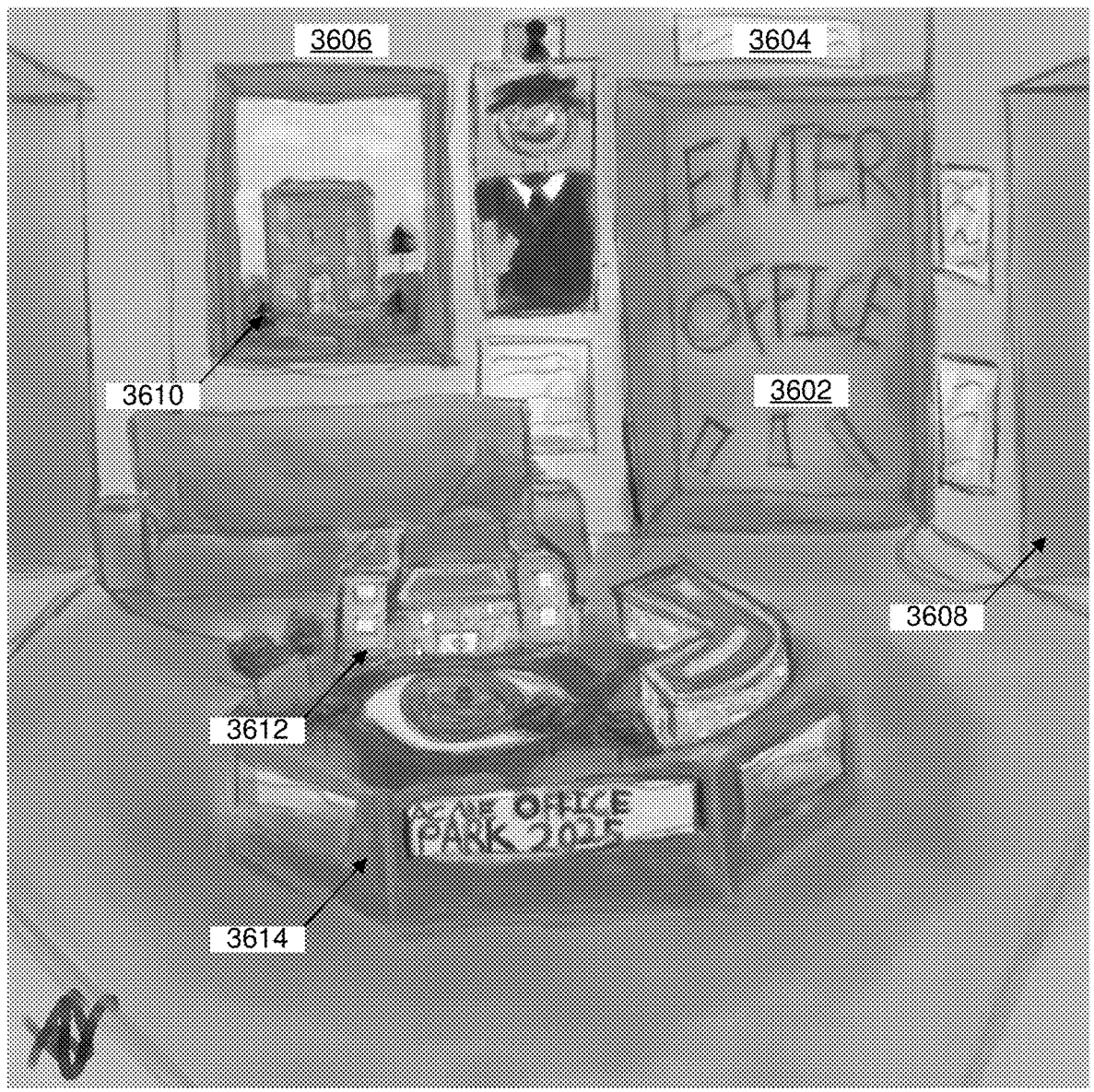

FIG. 36 shows a more customized virtual office space 3600, such as a HexPod "lobby" for an architectural firm, and the like. There are "doors" 3602 to different offices 3604, and displays 3606 showing profile pictures, and the like. Windows 3608 (e.g., displays) allow display of models 3610 that the employees are working on, with the middle model 3612 in the public stage 3614.

Figure 37:
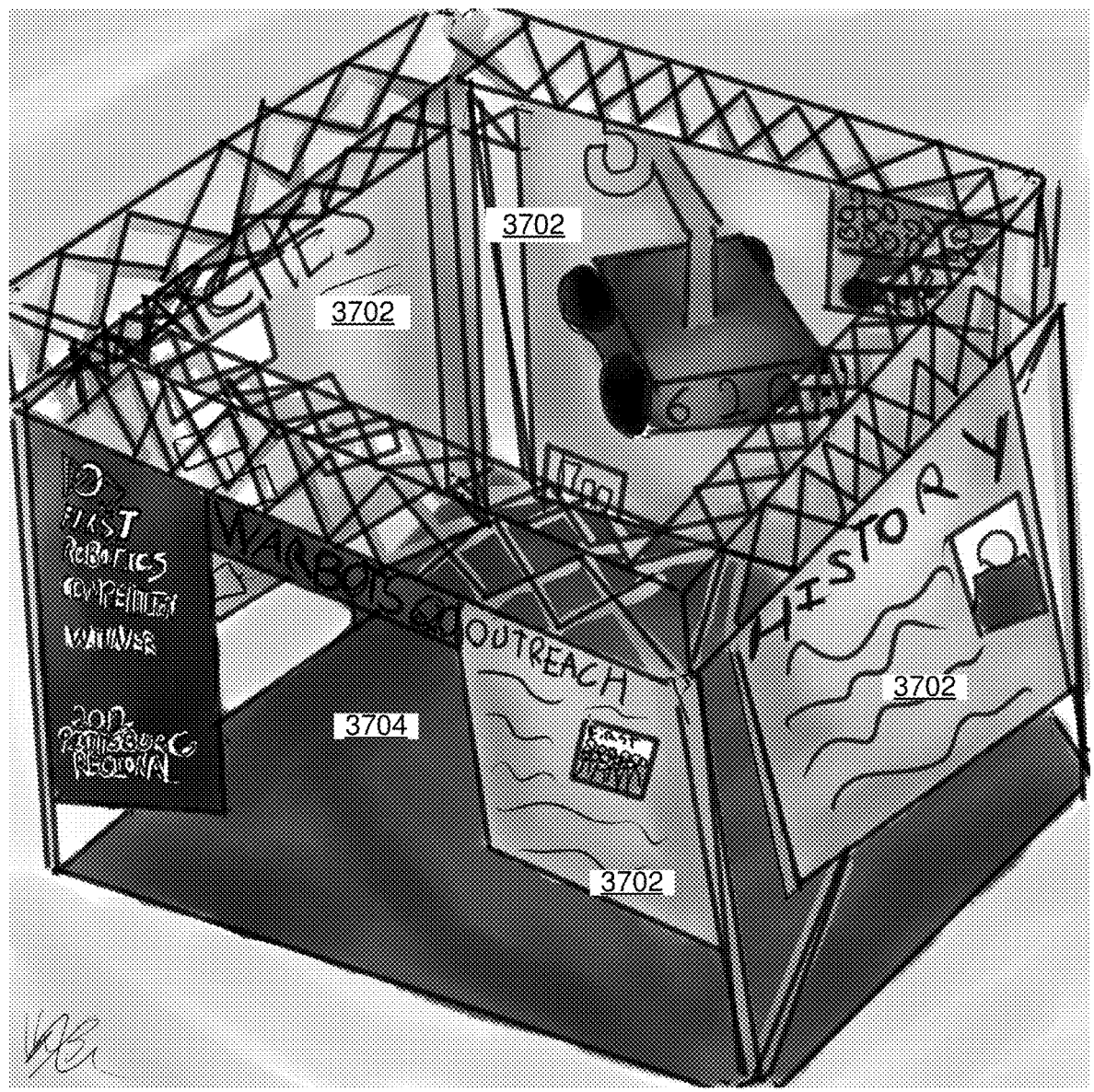

FIG. 37 is used to illustrate a robotics pit crew kiosk 3700 (e.g., square version) application, for example, for a High School's robotics team, and the like. Four screens 3702 are provided, each displaying different information, such as outreach or history information, and the like. One can move through slidedecks on the presentation displays. Furthermore, there are displays showing the model of the robot, livestream of the matches, match lineup, rankings, and the like. The kiosk also holds the robot and any tools needed in area 3704, and the like.

Figure 38:
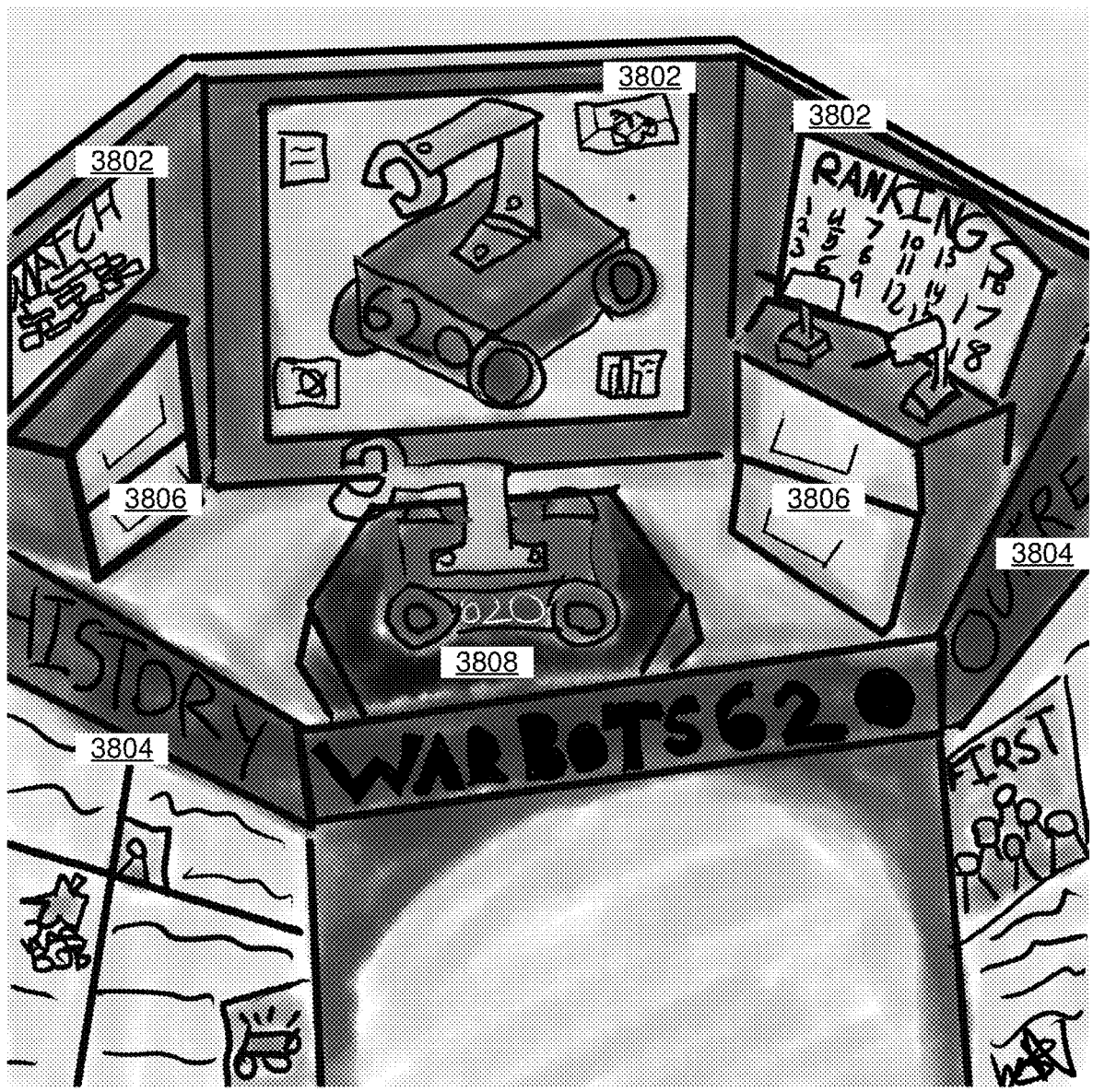
Figure 39:
Figure 40:
Figure 41:
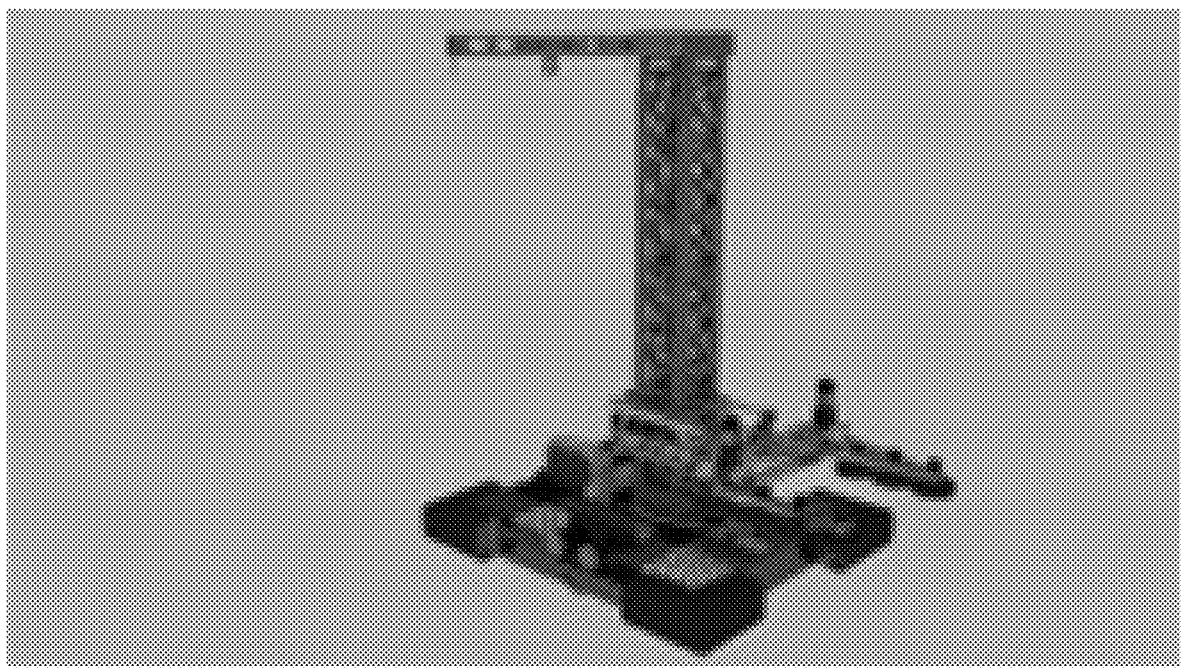

FIG. 38 shows a hexagon version 3800, with six sides, with five screens 3802 on the inside, and five screens 3804 on the outside. The outside screens 3804 display team information, such as history, outreach, safety, robot 3808 specs, and the like. The inside screens 3802 display ranking, match lineup, models of the robot, and livestream of the matches, and the like. Two of the screens 3802 can be half the length to accommodate toolboxes 3806. Advantageously, the kiosks allow collaboration and coordination, displaying of information about the club, such as history, outreach, safety program, members, and specifics about the robot itself, etc., displaying a model of the robot both for viewing and for real time work, displaying statistics of the robot, and the like, as further shown in FIGS. 39-41.

Figure 42:
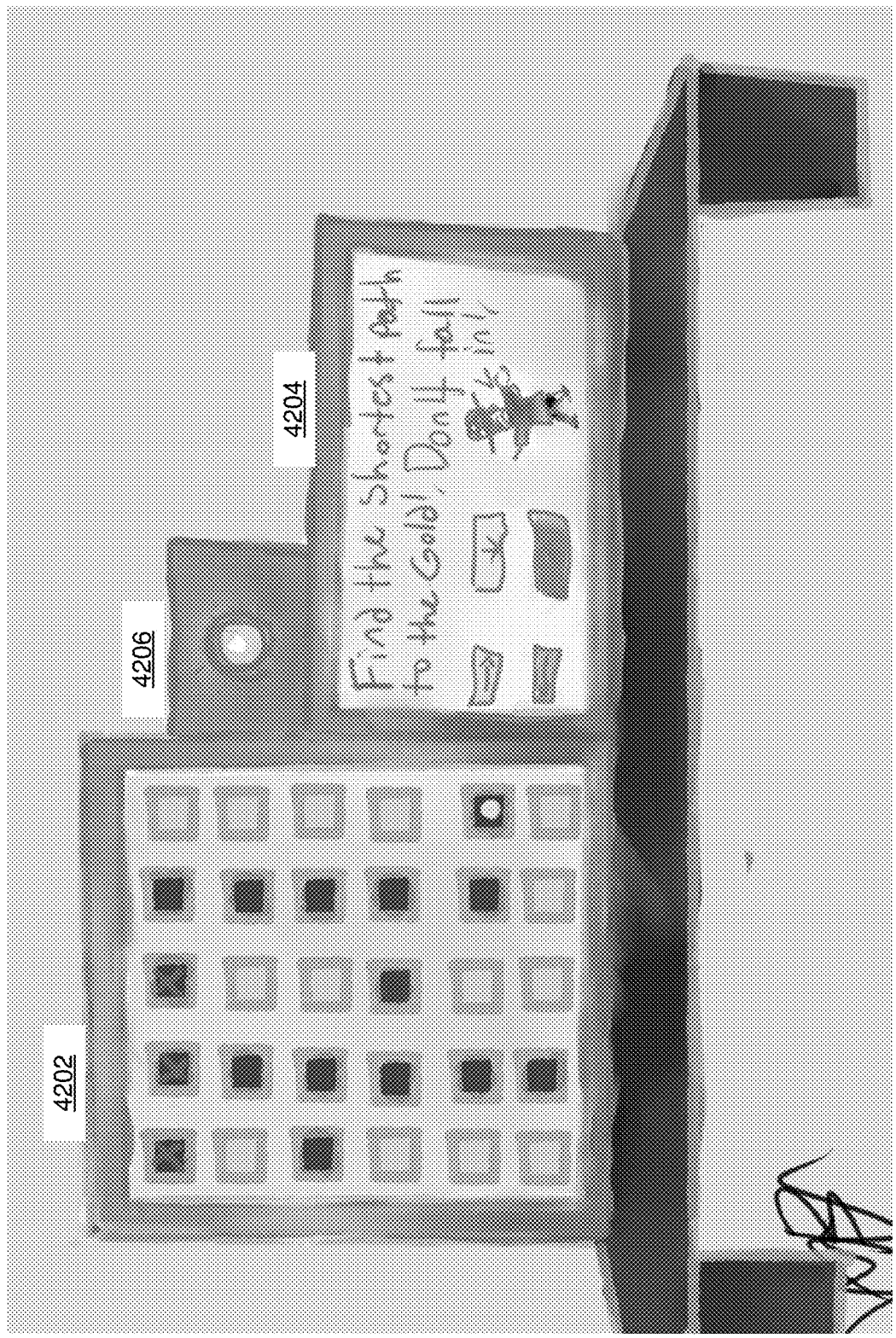

FIG. 42 shows a kiosk 4200 made for a coding club that teaches kids how to code. For example, at least two screens 4202 and 4204 are provided, one screen 4202 showing code, and the other screen 4204 showing a game, such as a maze, and the like, controlled by the code. The program can be controlled by a Kinect camera 4206, and the like. Advantageously, such applications can be used for teaching children foundational coding skills, collaboration, and the like.

Figure 43:
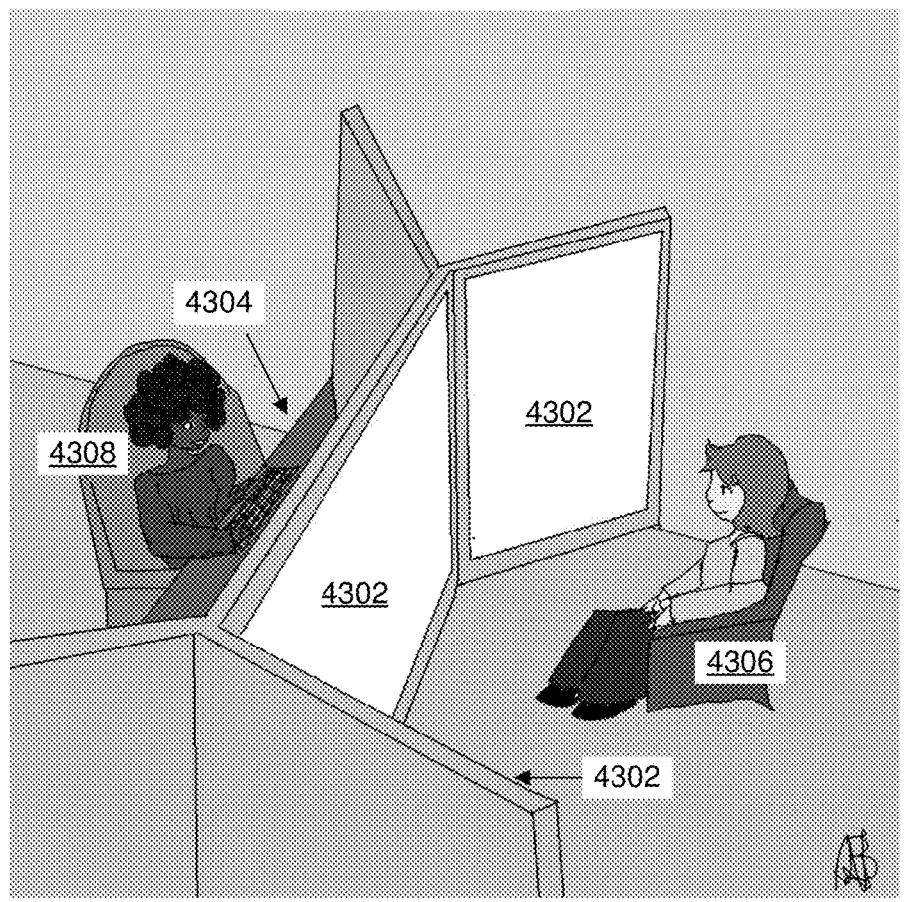

FIG. 43 is used to illustrate a kiosk 4300 with an inverted hex configuration. The kiosk 4300 allows for total immersion on both sides. At least three screens 4302 are provided on one side, and at least one screen 4304 on the other side. The kiosk 4300 can be used for work and presentations, and the like. A client 4306 sits in front of the three screens 4302, and watches a presentation given by a person 4308 on the other side. The presentation can either be controlled by the presenter 4308 or be provided automatically, and the client 4306 can interact with the presentation.

Figure 44:
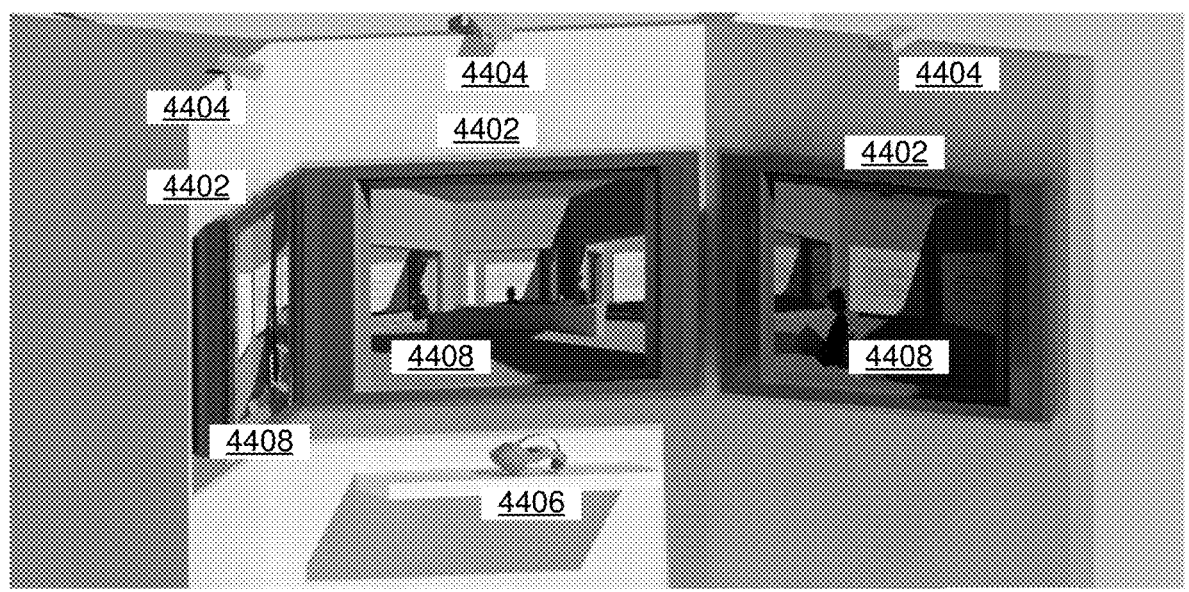
Figure 45:
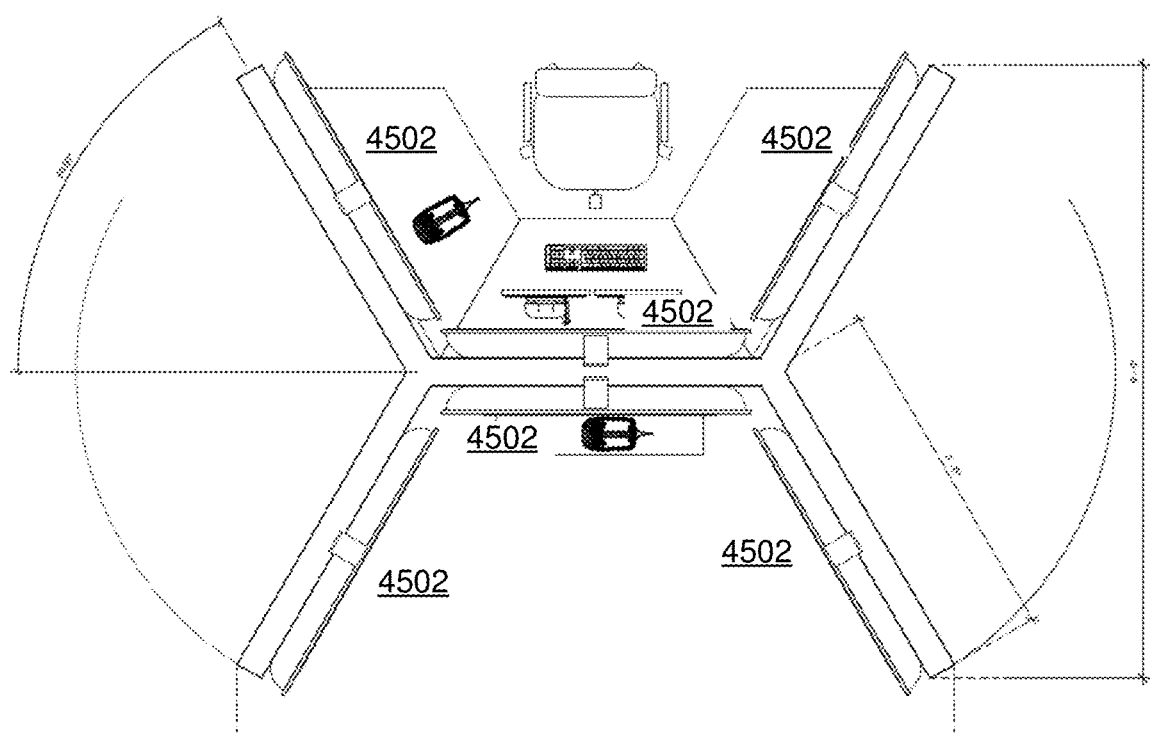

FIG. 44 shows the kiosk 4400 configured with displays 4402, Kinect 4404, and VR/AR devices 4406, and the like, and with the adjacent rooms 4408 displayed. In a similar manner, the kiosk 4400 can display a workgroup model on the center display, and other information (e.g., web conferencing, virtual co-worker room, etc.) on the other displays. FIG. 45 shows a top view of a kiosk 4500 configured with six windows or display screens 4502.

Figure 46:
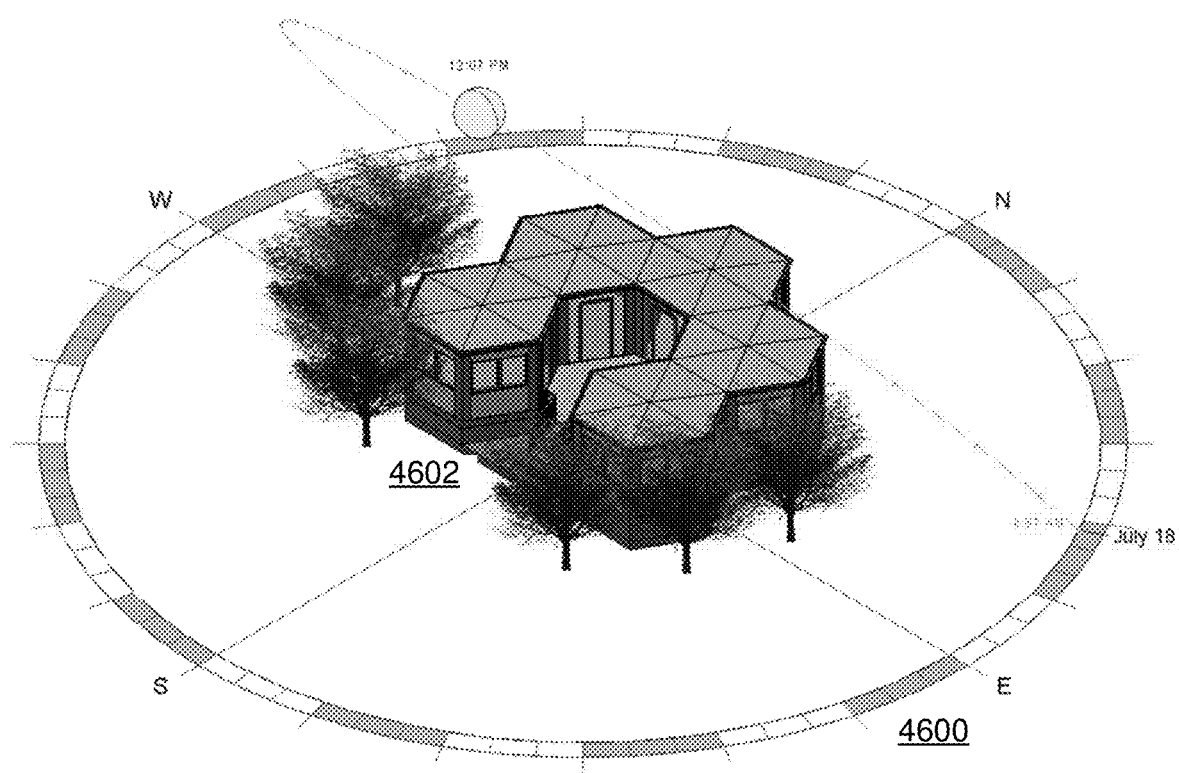

FIG. 46 shows a multi-hexapod configuration 4600, as a virtual model or a physical structure 4602. Advantageously, the hexapods can be configured as connected physical structures or as separate physical structures virtually connected.

Figure 49:
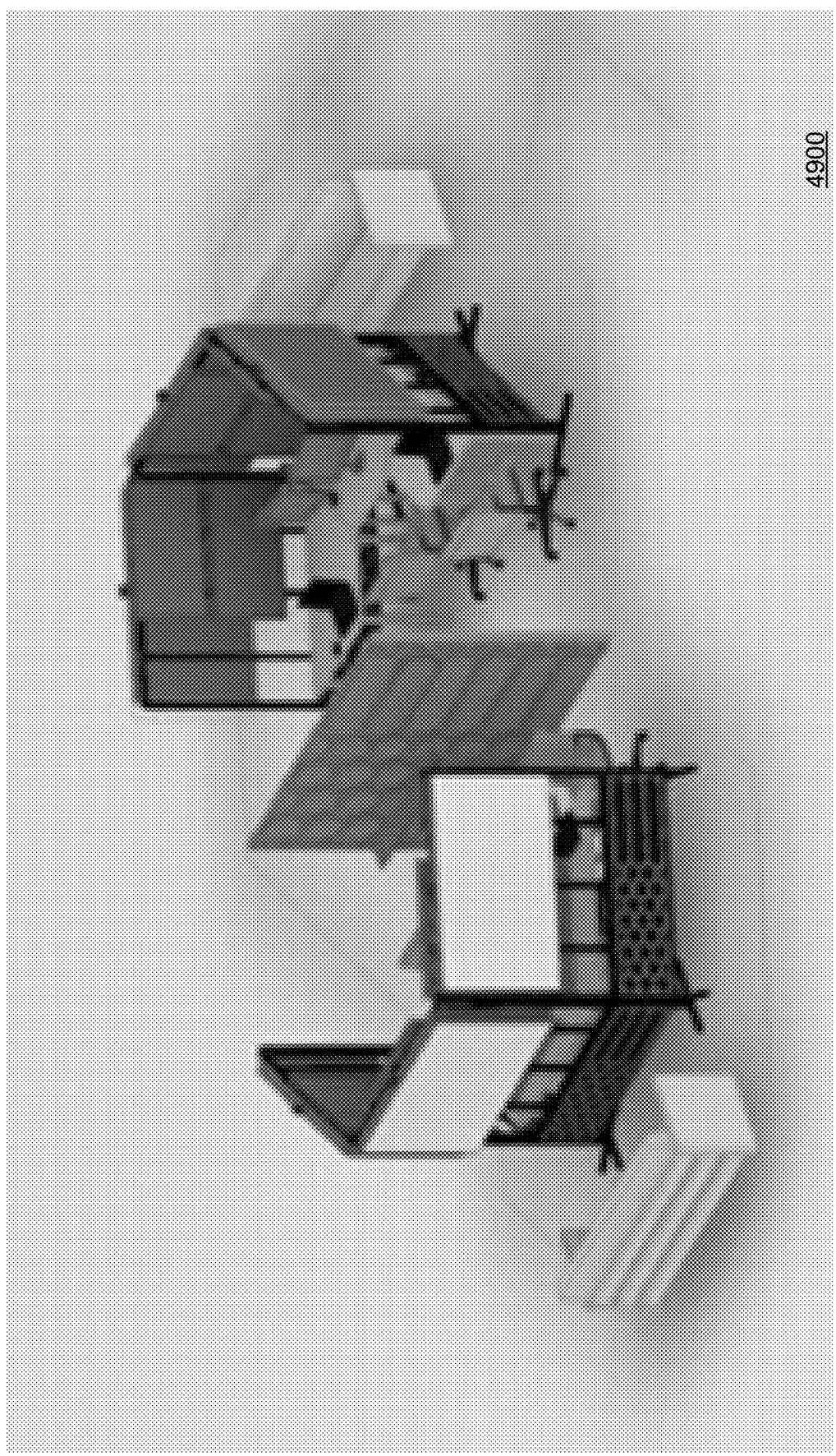

As previously described, the workgroup pods can include various configurations to generate virtual showroom applications that can allow a service provider to tailor a client's experience to their wants and needs, to guide the client through their options, and for providing tours of optimal office workspace with real-time interaction and collaboration, and the like, as illustrated in FIG. 47 configuration 4700, FIG. 48 configuration 4800 FIG. 49 configuration 4900.

Advantageously, the illustrative systems and methods allow for efficient and cost-effective workgroup pods for virtual and augmented reality applications, and the like.

Although the illustrative systems and methods are described in terms of workgroup pods, the illustrative systems and methods can be applied to any other suitable types of virtual and augmented reality technologies and structures, and the like, as will be appreciated by those of ordinary skill in the relevant art(s).

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A virtual and augmented reality system employing workgroup pods, the system comprising:
    a plurality of work pods configured as three-dimensional closed polygon physical structures having n sides including respective walls;
    each of the plurality of work pods including on at least one of the walls, an inside computer display on an inside of the wall, and an outside computer display on an outside of the wall;
    wherein the computer displays are linked to each other via a communications network for enabling augmented and/or virtual reality content to be displayed thereon;
    the inside display is configured as a private work stage for private augmented and/or virtual reality content to be displayed thereon,
    the outside display is configured a public private work stage for shared augmented and/or virtual reality content to be displayed thereon,
    one of the work pods is configured as a workgroup pod for receiving and merging shared augmented and/or virtual reality content from the other work pods on a private stage thereof, and for sharing and displaying the merged augmented and/or virtual reality content on a public stage thereof, and
    the plurality work pods are configured as an array of interconnected units, either as physically linked structures or as virtually distributed environments connected via a communication network, enabling seamless collaboration across multiple locations.

2. A method for virtual and augmented reality system employing workgroup pods, the method comprising:
    configuring a plurality of work pods as three-dimensional closed polygon physical structures having n sides including respective walls;
    including on at least one of the walls of each of the plurality of work pods, an inside computer display on an inside of the wall, and an outside computer display on an outside of the wall;
    linking the computer displays to each other via a communications network and enabling augmented and/or virtual reality content to be displayed thereon;
    configuring the inside display as a private work stage and displaying private augmented and/or virtual reality content thereon;
    configuring the outside display as a public private work stage and displaying shared augmented and/or virtual reality content thereon;
    configuring one of the work pods as a workgroup pod for receiving and merging shared augmented and/or virtual reality content from the other work pods on a private stage thereof, and for sharing and displaying the merged augmented and/or virtual reality content on a public stage thereof, and
    configuring the plurality work pods as an array of interconnected units, either as physically linked structures or as virtually distributed environments connected via a communication network, enabling seamless collaboration across multiple locations.

3. A computer program product for virtual and augmented reality system employing workgroup pods, and including one or more computer readable instructions embedded on a tangible, non-transitory computer and configured to cause one or more computer processors to perform the steps of:
    configuring a plurality of work pods as three-dimensional closed polygon physical structures having n sides including respective walls;
    including on at least one of the walls of each of the plurality of work pods, an inside computer display on an inside of the wall, and an outside computer display on an outside of the wall;
    linking the computer displays to each other via a communications network and enabling augmented and/or virtual reality content to be displayed thereon;
    configuring the inside display as a private work stage and displaying private augmented and/or virtual reality content thereon;

configuring the outside display as a public private work stage and displaying shared augmented and/or virtual reality content thereon;

configuring one of the work pods as a workgroup pod for receiving and merging shared augmented and/or virtual reality content from the other work pods on a private stage thereof, and for sharing and displaying the merged augmented and/or virtual reality content on a public stage thereof, and configuring the plurality work pods as an array of interconnected units, either as physically linked structures or as virtually distributed environments connected via a communication network, enabling seamless collaboration across multiple locations.

4. The system of claim 1, wherein the plurality of work pods are configured as an interconnected array, enabling interaction between multiple workgroup pods and at least one public workgroup stage to facilitate real-time collaboration.

5. The method of claim 2, further comprising:
configuring the plurality of work pods as an interconnected array; and
enabling interaction between multiple workgroup pods and at least one public workgroup stage to facilitate real-time collaboration.

6. The computer program product of claim 3, further comprising the steps of:
configuring the plurality of work pods as an interconnected array; and
enabling interaction between multiple workgroup pods and at least one public workgroup stage to facilitate real-time collaboration.

7. The system of claim 1, wherein the plurality of work pods are configured to dynamically modify the displayed augmented and virtual reality content based on user interactions and visualization aides to facilitate synchronized interaction and updates.

8. The method of claim 2, further comprising:
dynamically modifying the displayed augmented and virtual reality content within the plurality of work pods based on user interactions and visualization aides; and
facilitating synchronized interaction and updates across the plurality of work pods.

9. The computer program product of claim 3, further comprising the steps of:
dynamically modifying the displayed augmented and virtual reality content within the plurality of work pods based on user interactions and visualization aides; and
facilitating synchronized interaction and updates across the plurality of work pods.

10. The system of claim 1, wherein the plurality of work pods are configured dynamically as connected physical structures or virtually connected environments based on multi-user interaction and shared workgroup environments.

11. The method of claim 2, further comprising:
configuring the plurality of work pods dynamically as connected physical structures or virtually connected environments based on multi-user interaction and shared workgroup environments.

12. The computer program product of claim 3, further comprising the steps of:
configuring the plurality of work pods dynamically as connected physical structures or virtually connected environments based on multi-user interaction and shared workgroup environments.

13. The system of claim 1, wherein the plurality of work pods are configured to enable gesture-based interaction for controlling augmented and virtual reality content displayed on private and public work stages.

14. The method of claim 2, further comprising:
receiving user input via gesture-based interaction within the plurality of work pods; and
controlling augmented and virtual reality content displayed on private and public work stages in response to the gesture-based interaction.

15. The computer program product of claim 3, further comprising the steps of:
receiving user input via gesture-based interaction within the plurality of work pods; and
controlling augmented and virtual reality content displayed on private and public work stages in response to the gesture-based interaction.

16. The system of claim 1, wherein the plurality of work pods are configured to provide an augmented and virtual reality environment with immersive features including at least one of haptic feedback, sound, and spatial interactions.

17. The method of claim 2, further comprising:
configuring the plurality of work pods to provide an augmented and virtual reality environment with immersive features including at least one of haptic feedback, sound, and spatial interactions.

18. The computer program product of claim 3, further comprising the steps of:
configuring the plurality of work pods to provide an augmented and virtual reality environment with immersive features including at least one of haptic feedback, sound, and spatial interactions.

* * * * *